United States Patent
Ishikawa et al.

(10) Patent No.: US 10,513,439 B2
(45) Date of Patent: Dec. 24, 2019

(54) METHOD FOR PRODUCING AEI ZEOLITE

(71) Applicant: TOSOH CORPORATION, Yamaguchi (JP)

(72) Inventors: Tomoya Ishikawa, Yamaguchi (JP); Hidekazu Aoyama, Yamaguchi (JP); Mitsuaki Yoshimitsu, Yamaguchi (JP); Seiji Maehama, Yamaguchi (JP); Takayoshi Mishima, Yamaguchi (JP); Yasuyuki Takamitsu, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 4 days.

(21) Appl. No.: 15/751,036

(22) PCT Filed: Aug. 9, 2016

(86) PCT No.: PCT/JP2016/073448
§ 371 (c)(1),
(2) Date: Feb. 7, 2018

(87) PCT Pub. No.: WO2017/026484
PCT Pub. Date: Feb. 16, 2017

(65) Prior Publication Data
US 2018/0230017 A1    Aug. 16, 2018

(30) Foreign Application Priority Data
Aug. 13, 2015  (JP) .................. 2015-159852
Aug. 19, 2015  (JP) .................. 2015-161754

(51) Int. Cl.
*C01B 39/48* (2006.01)
*B01J 29/70* (2006.01)
*C01B 39/04* (2006.01)

(52) U.S. Cl.
CPC .............. *C01B 39/48* (2013.01); *C01B 39/04* (2013.01); *B01J 29/70* (2013.01)

(58) Field of Classification Search
CPC ........... C01B 39/48; C01B 39/04; B01J 29/70
See application file for complete search history.

(56) References Cited

U.S. PATENT DOCUMENTS

| | | | | | |
|---|---|---|---|---|---|
| 5,958,370 | A * | 9/1999 | Zones | .............. | B01D 53/02 208/111.01 |
| 7,008,610 | B2 * | 3/2006 | Cao | .............. | B01J 29/70 423/706 |
| 8,057,782 | B2 * | 11/2011 | Miller | .............. | C01B 37/00 423/702 |
| 9,044,744 | B2 * | 6/2015 | Casci | .............. | B01D 53/9418 |
| 10,035,141 | B2 * | 7/2018 | Sano | .............. | B01D 53/8628 |
| 2005/0197519 | A1 | 9/2005 | Cao et al. | | |
| 2005/0197520 | A1 * | 9/2005 | Mertens | .............. | B01J 29/7015 585/640 |
| 2008/0159952 | A1 | 7/2008 | Miller et al. | | |
| 2014/0271426 | A1 * | 9/2014 | Casci | .............. | B01D 53/9418 423/213.2 |
| 2015/0246345 | A1 * | 9/2015 | Collier | .............. | B01J 37/0234 423/700 |
| 2016/0144347 | A1 | 5/2016 | Sano et al. | | |
| 2017/0259250 | A1 * | 9/2017 | Tanaka | .............. | B01J 29/76 |
| 2018/0093255 | A1 * | 4/2018 | Chen | .............. | B01D 53/9418 |

FOREIGN PATENT DOCUMENTS

| JP | 2010-514662 A | 5/2010 |
|---|---|---|
| WO | 2015/005369 A1 | 1/2015 |
| WO | 2016/080547 A1 | 5/2016 |

OTHER PUBLICATIONS

Naoto Nakazawa et al., "Direct synthesis of high-silica SSZ-39", with English Translation, Graduate School of Engineering, Yokohama National University, Nov. 26, 2014, pp. 13, vol. 30.
Paul Wagner et al., "Guest/Host Relationships in the Synthesis of the Novel Cage-Based Zeolites SSZ-36 and SSZ-39", J.Am.Chem. Soc., 2000, pp. 263-273, vol. 122.
Manuel Moliner et al. "Cu-SSZ-39, an active and hydrothermally stable catalyst for the selective catalytic reduction of NOx", Chem. Commun, 48, 2012, pp. 8264-8266.
Toshihiro Maruo et al. "Facile Synthesis of AEI Zeolites by Hydrothermal Conversion of FAU Zeolites in the Presence of Tetraethylphosphonium Cations", Chemistry Letters, 43, 2014, pp. 302-304.
Nuria Martin et al., "Efficient synthesis of the Ci-SSZ-39 catalyst for DeBOx applications", Chem. Commun., 51, 2015, pp. 11030-11033.
International Search Report from Patent Application No. PCT/JP2016/073448, dated Sep. 6, 2016.
Michiel Dusselier et al., "Influence of organic structure directing agent isomer distribution on the synthesis of SSZ-39" Chem. Mater. 2015, 27, pp. 2695-2702.
Supporting information for Michiel Dusselier et al., "Influence of organic structure directing agent isomer distribution on the synthesis of SSZ-39" Chem. Mater. 2015, 27, pp. 2695-2702.
Manuel Moliner et al., "ESI Cu-SSZ-39, an active and hydrothermally stable catalyst for the selective catalytic reduction of NOx" The Royal Society of Chemistry 2012.

* cited by examiner

*Primary Examiner* — David M Brunsman
(74) *Attorney, Agent, or Firm* — Greenblum & Bernstein, P.L.C.

(57) ABSTRACT

Provided is a production method by which an AEI zeolite is obtained without inducing a structural transformation in a crystalline aluminosilicate having a Y-structure and without using fluorine or phosphorus, the method including a crystallization step of crystallizing a composition containing an alumina source, a silica source, a structure directing agent, a sodium source, and water, a weight proportion of crystalline aluminosilicate relative to a total weight of the alumina source and the silica source being from 0 wt. % to 10 wt. %, and the crystallization step satisfying at least one of the following conditions: a molar ratio of hydroxide ion to silica in the composition is 0.45 or greater, the composition contains a cation represented by $(CH_3)_3RN^+$ (R represents an alkyl group having from 1 to 4 carbons, and the alkyl group may contain at least one substituent), and the crystallization time is 80 hours or longer.

11 Claims, No Drawings

METHOD FOR PRODUCING AEI ZEOLITE

This application is a 371 filing of PCT/JP2016/073448, filed Aug. 19, 2016

TECHNICAL FIELD

The present invention relates to a method for producing an AEI zeolite.

BACKGROUND ART

An AEI zeolite is an artificially synthesized crystalline aluminosilicate and has been studied as a catalyst for olefin production and a catalyst for selective catalytic reduction (a so-called SCR catalyst) (Patent Document 1). The following methods are disclosed as methods for producing an AEI zeolite.

Patent Document 1 discloses a method for producing an AEI zeolite, the method including crystallizing a mixture containing sodium silicate and a Zeolite Y, and the AEI zeolite having a molar ratio of silica to alumina of greater than 10 (hereinafter, also referred to as "$SiO_2/Al_2O_3$ ratio"). It is disclosed that the production method according to Patent Document 1 takes 5 to 7 days for the crystallization to obtain the AEI zeolite.

Non-Patent Document 1 discloses a method for producing an AEI zeolite, the method including crystallizing a mixture containing sodium silicate and a Zeolite Y. Non-Patent Document 1 discloses that no AEI zeolite is obtained in the case where a mixture having the molar ratio of $SiO_2/Al_2O_3$ other than 30 is crystallized.

Non-Patent Document 2 discloses a method for producing an AEI zeolite, the method including crystallizing a mixture containing sodium silicate and a Zeolite Y. The $SiO_2/Al_2O_3$ ratio of the AEI zeolite is 18.2 and 14.8. It is disclosed that the production method according to Non-Patent Document 2 takes 7 days for the crystallization to obtain the AEI zeolite.

Patent Document 2 discloses a method for producing an AEI zeolite, the method including crystallizing a mixture containing tetraethyl orthosilicate as a silica source, aluminum nitrate, and hydrofluoric acid, and the AEI zeolite having an $SiO_2/Al_2O_3$ ratio of greater than 100. The $SiO_2/Al_2O_3$ ratio of the AEI zeolite is 532 and 466.

Non-Patent Document 3 describes a method for producing an AEI zeolite, the method including crystallizing a raw material containing a Zeolite Y and a tetraethylphosphonium cation. It is disclosed that the production method according to Non-Patent Document 3 takes 1 day for the crystallization to obtain the AEI zeolite.

Non-Patent Document 4 discloses a method for producing SSZ-39, the method including crystallizing a raw material containing a colloidal silica, a Zeolite Y, and a 1,1,3,5-tetramethylpiperidinium cation. It is disclosed that the production method according to Non-Patent Document 4 takes 66 hours or longer for the crystallization to obtain the AEI zeolite.

Non-Patent Document 5 discloses a method for producing SSZ-39, the method including crystallizing a raw material containing a USY zeolite and a 1,1,3,5-tetramethylpiperidinium cation. It is disclosed that the production method according to Non-Patent Document 5 takes 7 days for the crystallization to obtain the AEI zeolite. Furthermore, Non-Patent Document 5 discloses a method for producing SSZ-39, the method including crystallizing a raw material containing a USY zeolite, a copper-polyamine complex, and a 1,1,3,5-tetramethylpiperidinium cation. The crystallization time is not described.

CITATION LIST

Patent Literature

Patent Document 1: U.S. Pat. No. 5,958,370
Patent Document 2: US 2005/0,197,519 A

Non-Patent Literature

Non-Patent Document 1: J. Am. Chem. Soc., 122 (2000) p. 263
Non-Patent Document 2: Chem. Commun., 48 (2012) p. 8264
Non-Patent Document 3: Chemistry Letters, 43 (2014) p. 302
Non-Patent Document 4: 30th Zeolite Conference, A5 (2014)
Non-Patent Document 5: Chem. Commun., 51 (2015) p. 11030

SUMMARY OF INVENTION

Technical Problem

All of methods for producing an AEI zeolite having the $SiO_2/Al_2O_3$ ratio of 100 or less that have been reported so far are production methods that transform the structure of crystalline aluminosilicate having a Y-structure into an AEI zeolite.

Furthermore, Patent Document 2 does not use crystalline aluminosilicate having a Y-structure. However, the obtained AEI zeolites are only AEI zeolites having a high ratio of $SiO_2/Al_2O_3$ of greater than 100. Furthermore, in Patent Document 2 and Non-Patent Document 3, the crystallization of the AEI zeolite is possible in a relatively short time period. However, these production methods require the use of a raw material containing fluorine or phosphorus. The fluorine and the phosphorus are, needless to say, contained in the AEI zeolite and also contained in wastewater after the production of the AEI zeolite and the like. Therefore, additional treatment such as wastewater treatment and equipment are required, and the production cost of an AEI zeolite is increased. Furthermore, because the method for producing an AEI zeolite of Patent Document 2 uses fluorine having high corrosivity, a typical production facility for zeolite cannot be used.

As described above, in practical methods for producing an AEI zeolite, especially methods for producing an AEI zeolite having the $SiO_2/Al_2O_3$ ratio of 100 or less, an alumina source is limited to crystalline aluminosilicate having a Y-structure. The cost of the crystalline aluminosilicate is high. Therefore, it has been difficult to employ the method for producing an AEI zeolite by using crystalline aluminosilicate as an industrial production method.

Furthermore, methods for producing an AEI zeolite that have been disclosed take time for the crystallization. Therefore, these production methods are production methods with high costs and also with significantly low productivity, and it has been difficult to employ these production methods as industrial methods for producing AEI zeolites.

In light of these problems, an object of the present invention is to provide a production method by which an AEI zeolite is obtained without inducing a structural transformation in a crystalline aluminosilicate having a Y-structure and without using fluorine or phosphorus. Furthermore, another object of the present invention is to provide an industrial method for producing an AEI zeolite that suppresses production cost, especially an AEI zeolite having the $SiO_2/Al_2O_3$ ratio of 100 or less. In addition, yet another object of the present invention is to provide a method for producing an AEI zeolite with high productivity compared to the productivities of known methods for producing an AEI zeolite without substantially using a raw material containing fluorine or phosphorus.

Solution to Problem

The inventors of the present invention studied methods for producing an AEI zeolite, especially industrial methods for producing an AEI zeolite. As a result, the inventors found that, by crystallizing a particular composition containing a structure directing agent and an alumina source, an AEI zeolite can be obtained without inducing a structural transformation in a crystalline aluminosilicate having a Y-structure and without using fluorine. The inventors found that such a production method can produce an AEI zeolite without using a component that requires drainage management, such as fluorine and phosphorus, and thus completed the present invention. Furthermore, the inventors found that an AEI zeolite can be obtained in a shorter period of crystallization time by allowing a third component except the main components such as an alumina source, a silica source, and a structure directing agent to coexist in a composition that is a raw material, compared to known methods of producing an AEI zeolite.

That is, the gist of the present invention is as follows.

(1) A method for producing an AEI zeolite, the method including a crystallization step of crystallizing a composition containing an alumina source, a silica source, a structure directing agent, a sodium source, and water, a weight proportion of crystalline aluminosilicate relative to a total weight of the alumina source and the silica source being from 0 wt. % to 10 wt. %, and the crystallization step satisfying at least one of the following conditions: a molar ratio of hydroxide ion to silica in the composition is 0.45 or greater, the composition contains a cation represented by $(CH_3)_3RN^+$ (R represents an alkyl group having from 1 to 4 carbons, and the alkyl group may contain at least one substituent), and the crystallization time is 80 hours or longer.

(2) The method according to (1) above, where the alumina source is an amorphous alumina compound.

(3) The method according to (1) or (2) above, where the alumina source is at least one type selected from the group consisting of aluminum sulfate, aluminum chloride, aluminum hydroxide, pseudoboehmite, alumina sol, and amorphous aluminosilicate.

(4) The method according to any one of (1) to (3) above, where the structure directing agent is a piperidinium cation.

(5) The method according to any one of (1) to (4) above, where the structure directing agent is at least one type selected from the group consisting of 1,1,3,5-tetramethylpiperidinium cation, 1,1-diethyl-2,6-dimethylpiperidinium cation, 1,1,2,6-tetramethylpiperidinium cation, 1-ethyl-1,2,6-trimethylpiperidinium cation, and 1,1,2-triethylpiperidinium cation.

(6) The method according to any one of (1) to (5) above, where the composition does not contain crystalline aluminosilicate having a Y-structure.

(7) The method according to any one of (1) to (6) above, where a fluorine content in the composition is 100 ppm by weight or less.

(8) The method according to any one of (1) to (7) above, where a molar ratio of silica to alumina of the AEI zeolite is 100 or less.

(9) The method according to any one of (1) to (8) above, where the composition contains the cation represented by $(CH_3)_3RN^+$ (R represents an alkyl group having from 1 to 4 carbons, and the alkyl group may contain at least one substituent).

(10) The method according to any one of (1) to (9) above, where the cation is at least one type selected from the group consisting of tetramethylammonium, ethyltrimethylammonium, (2-hydroxyethyl)trimethylammonium, and (2-hydroxypropyl)trimethylammonium.

(11) The method according to any one of (1) to (10) above, where the molar ratio of the hydroxide ion to the silica in the composition is less than 0.45.

(12) The method according to any one of (1) to (8) above, where the molar ratio of the hydroxide ion to the silica in the composition is 0.45 or greater.

Advantageous Effects of Invention

According to the present invention, a production method by which an AEI zeolite is obtained without inducing a structural transformation in a crystalline aluminosilicate having a Y-structure and without using fluorine can be provided. Because of this, the production cost can be reduced compared to the production cost of a known method for producing an AEI zeolite. Furthermore, according to the present invention, an industrial method for producing an AEI zeolite that suppresses production cost can be provided. Furthermore, the method for producing an AEI zeolite according to an embodiment of the present invention is suitable as a method for producing an AEI zeolite having the $SiO_2/Al_2O_3$ ratio of 100 or less, 50 or less, or 25 or less.

Furthermore, by using a source composition containing a cation represented by $(CH_3)_3RN^+$ (R represents an alkyl group having from 1 to 4 carbons, and the alkyl group may contain at least one substituent) (hereinafter, also referred to as "quaternary ammonium cation"), the AEI zeolite can be crystallized in a shorter period of time compared to that of a known method for producing an AEI zeolite, in addition to the fact that the AEI zeolite can be crystallized without inducing a structural transformation in a crystalline aluminosilicate having a Y-structure. According to the present invention, a method for producing an AEI zeolite with high productivity compared to the productivity of a known method for producing an AEI zeolite without substantially using a raw material containing fluorine or phosphorus can be provided.

DESCRIPTION OF EMBODIMENTS

The method for producing an AEI zeolite according to an embodiment of the present invention is described below.

The present invention relates to a method for producing an AEI zeolite. An AEI zeolite is a zeolite having an AEI structure and particularly an aluminosilicate having an AEI structure.

The aluminosilicate has a structure composed of repeating network of aluminum (Al) and silicon (Si) via oxygen (O).

An AEI structure is a structure resulting in an AEI-type composition according to the IUPAC structure code (hereinafter, also simply referred to as "structure code") prescribed by the Structure Commission of the International Zeolite Association.

The crystal phase of the AEI zeolite can be identified by comparing with a powder X-ray diffraction (hereinafter, referred to as "XRD") pattern described in Collection of simulated XRD powder patterns for zeolites, fifth revised edition, p. 22 (2007) or with an XRD pattern described for AEI in Zeolite Framework Types on the website of the Structure Commission of the International Zeolite Association, http://www.iza-structure.org/databases/.

An example of the AEI zeolite obtained according to an embodiment of the production method of the present invention is SSZ-39. Furthermore, the production method according to an embodiment of the present invention is suitable as a method for producing an AEI zeolite having the $SiO_2/Al_2O_3$ ratio of 100 or less, an AEI zeolite having the $SiO_2/Al_2O_3$ ratio of 50 or less, or an AEI zeolite having the $SiO_2/Al_2O_3$ ratio of 25 or less.

The production method according to an embodiment of the present invention includes a crystallization step of crystallizing a composition which contains an alumina source, a silica source, a structure directing agent, a sodium source, and water and in which a weight proportion of crystalline aluminosilicate relative to the total weight of the alumina source and the silica source is 10 wt. % or less. In the crystallization step, the composition (hereinafter, also referred to as "source composition") containing the alumina source, the silica source, the structure directing agent, the sodium source, and the water is crystallized, and thus an AEI zeolite is obtained.

The alumina source is aluminum (Al) and a compound containing aluminum. As the alumina source for producing a zeolite, typically, aluminum isopropoxide, aluminum sulfate, aluminum chloride, aluminum hydroxide, pseudoboehmite, alumina sol, amorphous aluminosilicate (hereinafter, also referred to as "amorphous aluminosilicate"), crystalline aluminosilicate, and the like have been known. The type of aluminum compound used as the alumina source significantly affects whether artificially synthesized zeolite can crystallize. The alumina source for obtaining a zeolite having a target structure is substantially limited. Even when the composition of the source composition is the same, a zeolite having the target structure may not be obtained depending on the type of alumina source.

An AEI zeolite is an artificially synthesized crystalline aluminosilicate. The only method for producing an AEI zeolite having the $SiO_2/Al_2O_3$ ratio of 100 or less is a method that restructures a structural unit of crystalline zeolite contained in the alumina source, i.e. a production method using a structural transformation of a zeolite, which is specifically a production method using a structural transformation of a crystalline aluminosilicate having a Y-structure. The crystalline aluminosilicate having a Y-structure has a structure resulting in a FAU-type composition according to the structure code, and is a crystalline aluminosilicate having the $SiO_2/Al_2O_3$ ratio of greater than 3. Specific examples thereof include at least one type selected from the group consisting of zeolite Y, USY zeolite, ZSM-3, ZSM-20, and LZ-210.

On the other hand, according to an embodiment of the production method of the invention of the present application, an AEI zeolite can be obtained without inducing a structural transformation of a crystalline aluminosilicate having a Y-structure and, in particular, an AEI zeolite having the $SiO_2/Al_2O_3$ ratio of 100 or less can be obtained. The alumina source is a compound containing aluminum and needs to be a compound other than the crystalline aluminosilicate having a Y-structure. In the production method according to an embodiment of the present invention, the AEI zeolite is preferably obtained without inducing a structural transformation of a crystalline aluminosilicate. The source composition has the weight proportion of the crystalline aluminosilicate relative to the total weight of the alumina source and the silica source of 10 wt. % or less, and preferably the weight proportion of the crystalline aluminosilicate having a structure resulting in a FAU-type relative to the total weight of the alumina source and the silica source of 10 wt. % or less. Furthermore, the source composition preferably has the weight proportion of the crystalline aluminosilicate having a Y-structure relative to the total weight of the alumina source and the silica source of 10 wt. % or less, more preferably 5 wt. % or less, or even more preferably 1 wt. % or less. Also, the source composition preferably contains substantially no crystalline aluminosilicate having a Y-structure.

Examples of the alumina source include at least one type selected from the group consisting of aluminum hydroxide, aluminum oxide, aluminum sulfate, aluminum chloride, aluminum nitrate, amorphous aluminosilicate, crystalline aluminosilicate, metallic aluminum, pseudoboehmite, alumina sol, and aluminum alkoxide. Furthermore, examples thereof include at least one type selected from the group consisting of aluminum hydroxide, aluminum oxide, aluminum sulfate, aluminum chloride, aluminum nitrate, amorphous aluminosilicate, crystalline aluminosilicate having a structure except the Y-structure, metallic aluminum, pseudoboehmite, alumina sol, and aluminum alkoxide.

The alumina source is preferably an amorphous aluminum compound. Because of this, it becomes easier to industrially employ the production method of the present invention compared to methods for producing an AEI zeolite using a crystalline aluminosilicate as the alumina source. Note that, as the amorphous aluminum compound, a compound that does not have regular peaks in the XRD and has a halo pattern with a wide width can be exemplified. The preferable alumina source is at least one type selected from the group consisting of aluminum sulfate, aluminum chloride, aluminum hydroxide, pseudoboehmite, alumina sol, and amorphous aluminosilicate, more preferably at least one type selected from the group consisting of aluminum sulfate, aluminum chloride, pseudoboehmite, alumina sol, and amorphous aluminosilicate, even more preferably at least one type selected from the group consisting of aluminum sulfate or amorphous aluminosilicate, and yet even more preferably an amorphous aluminosilicate. Because of this, the AEI zeolite can be crystallized without inducing a structural transformation of a crystalline aluminosilicate as well as, needless to say, the AEI zeolite can be crystallized without inducing a structural transformation of a crystalline aluminosilicate having a Y-structure. Furthermore, the silica content of the amorphous aluminosilicate as the alumina source is preferably greater than 43 wt. % (greater than 20 wt. % as the silicon content). Examples of the amorphous aluminosilicate include amorphous aluminosilicates having the $SiO_2/Al_2O_3$ ratio of preferably 1.4 to 2000, more preferably 1.4 to 100, and even more preferably 1.4 to 50.

The source composition may contain crystalline aluminosilicate except the crystalline aluminosilicate having a Y-structure. When the source composition contains a large amount of the crystalline aluminosilicate, the production of an AEI zeolite due to zeolite transformation becomes dominant. Because of this, it is not preferable for the source composition to contain a large amount of the crystalline aluminosilicate. On the other hand, a small amount of the crystalline aluminosilicate functions as seed crystals, and this promotes generation of nuclei of AEI zeolites. Because of this, the source composition may contain seed crystals, and the weight proportion of the Si and the Al in the crystalline aluminosilicate in the source composition, in terms of oxide, relative to the total weight of the Si and the Al in the source composition, in terms of oxide, (hereinafter, also referred to as "$(Si\text{---}Al)_{Cry}/(Si\text{---}Al)_{Total}$" or "seed crystal content") is preferably from 0 wt. % to 10 wt. %, and more preferably from 0 wt. % to 5 wt. %. When the source composition contains the crystalline aluminosilicate, the seed crystal content is greater than 0 wt. % but 10 wt. % or less, greater than 0 wt. % but 9.2 wt. % or less, from 3 wt. % to 5 wt. %, or from 4.1 wt. % to 4.6 wt. %.

Note that the total weight of the Si and the Al in terms of oxide in the source composition is the total weight obtained by measuring the Si and the Al in the source composition and converting each of the values in terms of $SiO_2$ and $Al_2O_3$. Similarly, the weight of the Si and the Al in the crystalline aluminosilicate in the source composition is the total weight obtained by measuring the Si and the Al in the crystalline aluminosilicate and converting each of the values in terms of $SiO_2$ and $Al_2O_3$.

The crystalline aluminosilicate contained in the source composition is a crystalline aluminosilicate having a structure except the Y-structure. Examples thereof include crystalline aluminosilicates except the zeolite, which are selected from the group consisting of zeolite Y, USY zeolite, ZSM-3, ZSM-20, and LZ-210. Because of this, the AEI zeolite can be produced without inducing a structural transformation of the zeolite Y even when a crystalline aluminosilicate is present and can be produced mainly through crystallization of an amorphous aluminum compound. Furthermore, when the source composition contains a crystalline aluminosilicate, the crystalline aluminosilicate is at least one type selected from the group consisting of an AEI zeolite, a CHA zeolite, a KFI zeolite, and an LEV zeolite, is preferably at least one type selected from the group consisting of an AEI zeolite and a CHA zeolite, and is more preferably a CHA zeolite. By allowing a small amount of the CHA zeolite to be contained in the source composition, generation of the crystalline aluminosilicate except the AEI zeolite, such as an ANA zeolite, tends to be further suppressed.

The crystalline aluminosilicate contained in the source composition has an average particle size of 0.5 μm to 5 μm, 0.5 μm to 4 μm, or 0.85 μm to 4 μm.

The silica source is a compound containing silicon (Si). The silica source is at least one type selected from the group consisting of silica sol, fumed silica, colloidal silica, precipitated silica, amorphous silicate, amorphous aluminosilicate, and crystalline aluminosilicate, preferably at least one type selected from the group consisting of silica sol, fumed silica, colloidal silica, precipitated silica, amorphous silicate, and amorphous aluminosilicate, and more preferably at least one type selected from the group consisting of amorphous silicate and amorphous aluminosilicate.

As the structure directing agent (hereinafter, also referred to as "SDA") that can provide an AEI zeolite, a publicly known compound as a compound that directs the AEI zeolite can be used. As such a compound, a piperidinium cation, a pyrazolinium cation, a pyrrolidinium cation, an azonium[5,4]decane cation, an azoniabicyclo[3,3,1]nonane cation, an azoniabicyclo[3,2,1]octane cation, a camphidinium cation, and the like have been known.

In the production method according to an embodiment of the present invention, the SDA is preferably a piperidinium cation, is preferably at least one selected from the group consisting of N,N-alkyl-2,6-alkylpiperidinium cation (N,N-dialkyl-2,6-dialkylpiperidinium cation) and N,N-alkyl-3,5-alkylpiperidinium cation (N,N-dialkyl-3,5-dialkylpiperidinium cation), is more preferably at least one selected from the group consisting of 1,1,3,5-tetramethylpiperidinium cation, 1,1-diethyl-2,6-dimethylpiperidinium cation, 1,1,2,6-tetramethylpiperidinium cation, 1-ethyl-1,2,6-trimethylpiperidinium cation, and 1,1,2-triethylpiperidinium cation, is even more preferably at least one selected from the group consisting of 1-ethyl-1,2,6-trimethylpiperidinium cation, 1,1-diethyl-2,6-dimethylpiperidinium cation (1,1-diethyl-cis-2,6-dimethylpiperidinium cation), and 1,1,3,5-tetramethylpiperidinium cation (1,1-dimethyl-3,5-dimethylpiperidinium cation), is yet even more preferably at least one selected from the group consisting of 1,1-diethyl-2,6-dimethylpiperidinium cation and 1,1,3,5-tetramethylpiperidinium cation, and is yet even more preferably 1,1,3,5-tetramethylpiperidinium cation. Among the compounds known as an SDA that can provide an AEI zeolite, by using any of these cations as an SDA, the used amount of the crystalline aluminosilicate that is expensive as an alumina source can be reduced.

The SDA contained in the source mixture is at least one type selected from the group consisting of hydroxides, halides, and sulfates containing any one of the cations described above; hydroxides or halides; at least one type selected from the group consisting of hydroxides, chlorides, bromides, and iodides; or at least one type selected from the group consisting of hydroxides, chlorides, and bromides of the cations described above. The SDA is preferably a salt of hydroxide because production facilities for general purpose can be used. Examples of particularly preferable SDA include at least one selected from the group consisting of 1,1-dimethyl-3,5-dimethylpiperidinium hydroxide (hereinafter, also referred to as "DMDMPOH") and 1,1-diethyl-cis-2,6-dimethyl piperidinium hydroxide (hereinafter, also referred to as "DEDMPOH").

Examples of the sodium source include compounds containing sodium and, particularly, sodium compounds exhibiting basicity. By allowing the source composition to contain sodium, AEI zeolite is more easily obtained from the amorphous alumina source. Specific examples of the sodium source include at least one type selected from the group consisting of sodium hydroxide, sodium carbonate, sodium chloride, sodium nitrate, sodium bromide, sodium iodide, and sodium sulfate, and more specifically sodium hydroxide is exemplified. Furthermore, when the silica source or the alumina source contain sodium, the sodium may also serve as a sodium source.

The source composition preferably contains a compound containing an alkali metal except sodium (hereinafter, also referred to as "alkali metal source"). By allowing the alkali metal source to be contained, production of crystalline aluminosilicate having a structure except the AEI zeolite as a byproduct tends to be suppressed. The alkali metal source is a compound containing an alkali metal except sodium, a compound containing at least one type selected from the group consisting of potassium, rubidium, and cesium, or a hydroxide containing at least one type selected from the group consisting of potassium, rubidium, and cesium.

Due to its industrial availability, the alkali metal source is preferably a compound containing potassium, and is more preferably at least one type selected from the group consisting of potassium hydroxide, potassium carbonate, potassium chloride, potassium iodide, and potassium bromide. Furthermore, due to its industrial availability and relatively low cost, the alkali metal source is preferably potassium hydroxide.

Furthermore, when the silica source or the alumina source contains alkali metal except sodium, the alkali metal may also serve as an alkali metal source.

The source composition contains water. The water contained in the source composition needs to be distilled water, deionized water, or pure water. Furthermore, the water may be water derived from other components contained in the source composition, such as the alumina source and the silica source.

The source composition preferably contains the cation (quaternary ammonium cation) represented by $(CH_3)_3RN^+$ (R represents an alkyl group having from 1 to 4 carbons, and the alkyl group may contain at least one substituent). Because of this, even when at least one of the amorphous aluminosilicate and the crystalline aluminosilicate except the crystalline aluminosilicate having a Y-structure is used as the alumina source or even when the amorphous aluminosilicate is used as the alumina source, the AEI zeolite can be crystallized, and the crystallization of the AEI zeolite is possible while the production cost is suppressed.

In addition to this, by allowing the source composition to contain a quaternary ammonium cation, the AEI zeolite can be crystallized in a shorter period of time compared to that of a known method for producing an AEI zeolite. That is, by allowing the source composition to contain a quaternary ammonium cation, the crystallization of the AEI zeolite is promoted. Because of this, the crystallization of the AEI zeolite can be performed in a shorter period of time compared to a known method for producing an AEI zeolite, and the AEI zeolite can be crystallized even when the molar ratio of the hydroxide ion relative to the silica in the source composition (hereinafter, also referred to as $OH^-/SiO_2$ ratio) is low. Because the crystallization of the AEI zeolite in an environment where the $OH^-/SiO_2$ ratio is even lower is possible, the AEI zeolite can be crystallized in a high yield. When the source composition contains a quaternary ammonium cation, at least one of the conditions, which are the $OH^-/SiO_2$ ratio of 0.45 or greater or the crystallization time of 80 hours or longer, may be satisfied. However, the AEI zeolite is crystallized in a form of a single phase even when the $OH^-/SiO_2$ ratio is less than 0.45, even when the crystallization time is shorter than 80 hours, or even when the $OH^-/SiO_2$ ratio is less than 0.45 and the crystallization time is shorter than 80 hours.

As one of a reason why the crystallization of the AEI zeolite is promoted by allowing the source composition to contain a quaternary ammonium cation, it is considered that a structural unit that derives an AEI zeolite tends to be produced due to the presence of the quaternary ammonium cation. It is conceived that the AEI zeolite is more easily obtained due to the production of the structural unit that derives an AEI zeolite compared to the case of a production method that produces the entire structure of the AEI zeolite.

R in the quaternary ammonium cation contained in the source composition is preferably an alkyl group having from 1 to 3 carbons, and more preferably an alkyl group having from 1 to 2 carbons. Furthermore, the R moiety may have at least 1, from 1 to 2, or 1 substituent. When the R moiety has a substituent, the substituent is preferably at least one type selected from the group consisting of a hydroxide group (OH), a mercapto group (SH), a halogen group, an oxo group (=O), a nitro group ($NO_2$), and an amino group ($NH_2$), more preferably a hydroxy group or an amino group, and even more preferably a hydroxy group.

Specific examples of the quaternary ammonium cation include at least one type selected from the group consisting of a tetramethylammonium cation, an ethyltrimethylammonium cation, a trimethylpropylammonium cation, an isopropyl trimethylammonium cation, a butyltrimethylammonium cation, an isobutyltrimethylammonium cation, a secondary butyltrimethylammonium cation, a tertiary butyltrimethylammonium cation, a hydroxymethyltrimethylammonium cation, a dihydroxymethyltrimethylammonium cation, a trihydroxymethyltrimethylammonium cation, a (2-hydroxyethyl)trimethylammonium cation, a (1-hydroxyethyl)trimethylammonium cation, a (1-hydroxypropyl) trimethylammonium cation, a (2-hydroxypropyl) trimethylammonium cation, a (3-hydroxypropyl) trimethylammonium cation, a (2-hydroxy-1-methylethyl) trimethylammonium cation, a (1-hydroxy-1-methylethyl) trimethylammonium cation, a (2,3-dihydroxypropyl) trimethylammonium cation, a (1-hydroxybutyl) trimethylammonium cation, a (2-hydroxybutyl) trimethylammonium cation, a (3-hydroxybutyl) trimethylammonium cation, a (4-hydroxybutyl) trimethylammonium cation, a (1-hydroxy-2-methylpropyl) trimethylammonium cation, a (2-hydroxy-2-methylpropyl) trimethylammonium cation, a (3-hydroxy-2-methylpropyl) trimethylammonium cation, a (1-hydroxy-1-methylpropyl) trimethylammonium cation, a (2-hydroxy-1-methylpropyl) trimethylammonium cation, a (3-hydroxy-1-methylpropyl) trimethylammonium cation, a (2-aminoethyl) trimethylammonium cation, a (2-mercaptoethyl) trimethylammonium cation, a (2-chloroethyl) trimethylammonium cation, a (2-oxoethyl) trimethylammonium cation, a (3-aminopropyl) trimethylammonium cation, a (2-methoxyethyl) trimethylammonium cation, a (2-oxopropyl) trimethylammonium cation, a (4-oxobutyl) trimethylammonium cation, a (2-amino-2-oxoethyl) trimethylammonium cation, a (2-carboxyethyl) trimethylammonium cation, a (2-hydroxyiminoethyl) trimethylammonium cation, and a (3-chloro-2-hydroxypropyl)trimethylammonium cation. Furthermore, the specific examples of the quaternary ammonium cation include at least one type selected from the group consisting of a tetramethylammonium cation (hereinafter, also referred to as "TMA"), an ethyltrimethylammonium cation (hereinafter, also referred to as "ETMA"), a trimethylpropylammonium cation (hereinafter, also referred to as "TMPA"), an isopropyltrimethylammonium cation (hereinafter, also referred to as "IPTMA"), a butyltrimethylammonium cation (hereinafter, also referred to as "BTMA"), an isobutyltrimethylammonium cation (hereinafter, also referred to as "IBTMA"), a secondary butyltrimethylammonium cation (hereinafter, also referred to as "SIBTMA"), a hydroxymethyltrimethylammonium cation (hereinafter, also referred to as "HMTMA"), a (2-hydroxyethyl)trimethylammonium cation (hereinafter, also referred to as "2-HETMA"), a (2-hydroxypropyl)trimethylammonium cation (hereinafter, also referred to as "2-HPTMA"), and a (2-hydroxybutyl) trimethylammonium cation (hereinafter, also referred to as "2-HBTMA"); furthermore, at least one type selected from the group consisting of TMA, ETMA, 2-HETMA, and 2-HPTMA; and at least one of TMA or 2-HETMA.

The quaternary ammonium cation contained in the source composition needs to be in a form of a salt of the cation described above, and is at least one type selected from the group consisting of hydroxides, chlorides, bromides, and iodides of the cations described above, or, furthermore, is at least one type selected from the group consisting of hydroxides, chlorides, and bromides of the cations described above.

The source composition contains a hydroxide ion ($OH^-$). The hydroxide ion may include a hydroxide ion brought by each component contained in the source composition. The $OH^-/SiO_2$ ratio in the source composition to crystallize the AEI zeolite is from 0.1 to 1.0, 0.2 to 0.8, or 0.3 to 0.8.

The higher the $OH^-/SiO_2$ ratio, the more crystallization of the AEI zeolite is promoted. When the $OH^-/SiO_2$ ratio is 0.45 or greater, the AEI zeolite is crystallized in a crystallization time that is industrially applicable even when the source composition does not contain the quaternary ammonium cation. When the source composition does not contain a quaternary ammonium cation, the $OH^-/SiO_2$ ratio is preferably from 0.45 to 0.8, and more preferably from 0.47 to 0.8. When the $OH^-/SiO_2$ ratio is 0.45 or greater, at least one of the conditions, which are the source composition containing a quaternary ammonium cation or the crystallization time of 80 hours or longer, may be satisfied. However, when the $OH^-/SiO_2$ ratio is 0.45 or greater, the AEI zeolite is crystallized in a form of a single phase even when the source composition does not contain a quaternary ammonium cation, even when the crystallization time is shorter than 80 hours, or even when the source composition does not contain a quaternary ammonium cation and the crystallization time is shorter than 80 hours.

When the source composition contains a quaternary ammonium cation, the AEI zeolite is crystallized even when the $OH^-/SiO_2$ ratio is low. When the source composition contains a quaternary ammonium cation, the $OH^-/SiO_2$ ratio is preferably 0.5 or less, more preferably 0.45 or less, even more preferably less than 0.45, and yet even more preferably 0.4 or less. When the $OH^-/SiO_2$ ratio is 0.5 or less, the AEI zeolite may be obtained in a higher yield. The $OH^-/SiO_2$ ratio of the source composition needs to be 0.1 or greater, or 0.2 or greater. When the source composition contains a quaternary ammonium cation, the particular preferable range of the $OH^-/SiO_2$ ratio is from 0.2 to 0.43, and more preferably from 0.2 to 0.4.

In the source composition, the molar ratio of the silica to the alumina ($SiO_2/Al_2O_3$ ratio) is preferably from 5 to 100, and more preferably from 5 to 90. The $SiO_2/Al_2O_3$ ratio of the obtained AEI zeolite is lower than the $SiO_2/Al_2O_3$ ratio of the source composition. Therefore, by setting the $SiO_2/Al_2O_3$ ratio to 100 or less, an AEI zeolite having the $SiO_2/Al_2O_3$ ratio of 100 or less can be obtained. Because the yield of the AEI zeolite is further enhanced, the $SiO_2/Al_2O_3$ ratio is preferably 10 or greater, more preferably 15 or greater, even more preferably 20 or greater, and yet even more preferably 23 or greater. Examples of the $SiO_2/Al_2O_3$ ratio of the source composition include from 5 to 100, from 10 to 100, from 10 to 65, 15 or greater but less than 60, from 15 to 50, and 15 or greater but less than 50.

When the AEI zeolite having the $SiO_2/Al_2O_3$ ratio of 50 or less is obtained, examples of the preferable $SiO_2/Al_2O_3$ ratio of the source composition include from 20 to 46, from 23 to 44, and from 23 to 36. Examples of the particularly preferable $SiO_2/Al_2O_3$ ratio of the source composition to obtain the AEI zeolite having the $SiO_2/Al_2O_3$ ratio of 10 to 30 include 15 or greater but less than 30, and from 20 to 28.

When the source composition contains a quaternary ammonium cation, examples of the more preferable $SiO_2/Al_2O_3$ ratio of the source composition include from 15 to 50, from 15 to 40, from 15 to 38, and from 20 to 28.

The molar ratio of the SDA to the silica in the source composition (hereinafter, also referred to as "$SDA/SiO_2$ ratio") is preferably 0.05 or greater. To further promote the crystallization of the AEI zeolite, the $SDA/SiO_2$ ratio is preferably 0.10 or greater, more preferably 0.13 or greater, and even more preferably 0.15 or greater. The SDA is preferably in a small amount from the perspective of reducing the production cost, and the $SDA/SiO_2$ ratio is preferably 0.40 or less, more preferably 0.30 or less, and even more preferably 0.25 or less. The $SDA/SiO_2$ ratio of the source composition is preferably from 0.05 to 0.40, more preferably from 0.10 to 0.30, even more preferably from 0.13 to 0.25, yet even more preferably from 0.13 to 0.23, and yet even more preferably from 0.15 to 0.23 from the perspective of efficiency of the crystallization and the production cost of the AEI zeolite.

The molar ratio of the sodium to the silica in the source composition (hereinafter, also referred to as "$Na/SiO_2$ ratio") is preferably from 0.01 to 1.0, and more preferably from 0.1 to 0.6. Examples of the particularly preferable range of the $Na/SiO_2$ ratio include 0.1 or greater but less than 0.3, from 0.1 to 0.25, from 0.1 to 0.2, and from 0.1 to 0.18.

The molar ratio of the alkali metal except sodium to the silica in the source composition (hereinafter, also referred to as "$M/SiO_2$ ratio") needs to be from 0 to 0.5, 0 or greater but less than 0.3, from 0 to 0.2, from 0 to 0.1, or from 0 to 0.05.

The molar ratio of the alkali metal except sodium to the sodium in the source composition (hereinafter, also referred to as "M/Na ratio") is from 0 to 2.0, greater than 0 but 1.0 or less, from 0.1 to 0.6, or from 0.05 to 0.6. The proportion of the alkali metal except sodium is preferably not greater than the proportion of the sodium, and examples of the M/Na ratio include from 0.05 to 0.5, from 0.05 to 0.35, from 0.1 to 0.5, and from 0.1 to 0.45.

When the source composition contains an alkali metal except sodium (M) and sodium, the preferable range of the molar ratio of the alkali metal to the silica in the source composition (hereinafter, also referred to as "$(M+Na)/SiO_2$") is from 0.1 to 0.6, from 0.1 to 0.5, or 0.1 or greater but less than 0.3. For example, the $(M+Na)/SiO_2$ ratio may be from 0.1 to 0.28, or from 0.1 to 0.25.

Examples of the molar ratio of water to silica of the source composition (hereinafter, referred to as "$H_2O/SiO_2$ ratio") include from 3 to 50, from 5.0 to 50.0, and from 5.0 to 25.0. By setting the $H_2O/SiO_2$ ratio to this range, the AEI zeolite is more easily crystallized from the amorphous alumina source.

To crystallize the AEI zeolite from the amorphous alumina source in a shorter period of time, the $H_2O/SiO_2$ ratio is preferably 5.0 or greater but less than 20.0. Note that, when the source composition contains the crystalline aluminosilicate, the $H_2O/SiO_2$ ratio is from 8.0 to 15.0.

When the source composition contains a quaternary ammonium cation, the $H_2O/SiO_2$ ratio is preferably 5 or greater but less than 20, more preferably from 5 to 15, and even more preferably from 7 to 12, to crystallize the AEI zeolite in a shorter period of time.

When the molar ratio of the quaternary ammonium cation of the source composition (hereinafter, referred to as "$Q/SiO_2$ ratio") is preferably from 0.0001 to 0.1, more preferably from 0.001 to 0.05, and even more preferably from 0.001 to 0.06. By setting the $Q/SiO_2$ ratio to this range, the crystallization of the AEI zeolite tends to be promoted.

The following molar composition may be cited as a preferred composition of the source composition. Each ratio in the following composition is a molar (mol) ratio, where M is an alkali metal except sodium and SDA is an organic structure directing agent.

SiO$_2$/Al$_2$O$_3$ ratio: from 5 to 100
SDA/SiO$_2$ ratio: from 0.05 to 0.40
Na/SiO$_2$ ratio: from 0.01 to 1.0
M/SiO$_2$ ratio: from 0 to 0.5
H$_2$O/SiO$_2$ ratio: from 5 to 50
OH$^-$/SiO$_2$ ratio: from 0.1 to 1.0

Furthermore, the source composition more preferably has the following composition.

SiO$_2$/Al$_2$O$_3$ ratio: 10 or greater but less than 60
SDA/SiO$_2$ ratio: from 0.1 to 0.30
Na/SiO$_2$ ratio: 0.05 or greater but less than 0.30
M/SiO$_2$ ratio: from 0.02 to 0.5
H$_2$O/SiO$_2$ ratio: 9 or greater but less than 20
OH$^-$/SiO$_2$ ratio: from 0.45 to 0.8

When the source composition contains a quaternary ammonium cation, the following molar composition may be cited as a preferred composition of the source composition. Each ratio in the following composition is a molar (mol) ratio, where M is an alkali metal except sodium, SDA is an organic structure directing agent, and Q is a quaternary ammonium cation.

SiO$_2$/Al$_2$O$_3$ ratio: from 10 to 100
Na/SiO$_2$ ratio: from 0.01 to 1
M/SiO$_2$ ratio: from 0 to 0.5
SDA/SiO$_2$ ratio: from 0.1 to 0.5
OH$^-$/SiO$_2$ ratio: from 0.1 to 0.5
H$_2$O/SiO$_2$ ratio: from 3 to 20
Q/SiO$_2$ ratio: from 0.0001 to 0.1

The following may be cited as a more preferred composition of the source composition.

SiO$_2$/Al$_2$O$_3$ ratio: from 20 to 50
Na/SiO$_2$ ratio: 0.1 or greater but less than 0.3
M/SiO$_2$ ratio: 0 or greater but less than 0.3
SDA/SiO$_2$ ratio: from 0.1 to 0.3
OH$^-$/SiO$_2$ ratio: from 0.1 to 0.45
H$_2$O/SiO$_2$ ratio: 3 or greater but less than 20
Q/SiO$_2$ ratio: from 0.001 to 0.05

The composition of the source composition needs to have a composition formed from any combination of the ranges of the SiO$_2$/Al$_2$O$_3$ ratio, the SDA/SiO$_2$ ratio, the Na/SiO$_2$ ratio, the M/SiO$_2$ ratio, the (M+Na)/SiO$_2$ ratio, the M/Na ratio, the H$_2$O/SiO$_2$ ratio, the OH$^-$/SiO$_2$ ratio, and the Q/SiO$_2$ ratio described in the present specification. In the present invention, the composition of the source composition can be determined by common methods.

The source composition preferably contains substantially no element that requires treatment for wastewater after the crystallization. Examples of such an element include fluorine (F) and phosphorus (P).

When the source composition contains fluorine, an anticorrosive material needs to be used for the production equipment. Because of this, the source composition preferably contains no fluorine, that is, the source composition preferably has the fluorine content of 0 ppm by weight. However, when ordinary measurement error due to composition analysis or the like is taken into account, the fluorine content of the source composition is not greater than the detection limit, is 100 ppm by weight or less, or is 10 ppm by weight or less. Due to the absence of the fluorine and the fluorine compound in the source composition, the AEI zeolite can be produced by using a facility for general purpose. Furthermore, the source composition preferably contains no phosphorus, and the phosphorus content is preferably not greater than the detection limit, more preferably 100 ppm by weight or less, or even more preferably 10 ppm by weight or less.

The fluorine content and the phosphorus content in the source composition can be measured by known measurement methods, such as ICP.

As long as the source composition is crystallized in the crystallization step, the crystallization method thereof may be selected as needed. A preferable crystallization method is to perform hydrothermal treatment on the source composition. Hydrothermal treatment may include placing the source composition in an airtight pressure-resistant container and then heating the container.

The source composition crystallizes as long as the crystallization temperature is 100° C. or higher. The higher the temperature, the more crystallization is accelerated. Because of this, the crystallization temperature is 130° C. or higher, and preferably 160° C. or higher. The crystallization temperature does not have to be higher than necessary as long as the source composition crystallizes. Because of this, the crystallization temperature is 200° C. or lower, preferably 190° C. or lower, and more preferably 180° C. or lower. Furthermore, the crystallization may be performed in either a state in which the source composition is being agitated in a self-generated pressure or in a state in which it is left still.

The crystallization time is preferably 80 hours or longer, or more preferably 100 hours or longer. When the crystallization time is 80 hours or longer, at least one of the conditions, which are the source composition containing a quaternary ammonium cation or the OH$^-$/SiO$_2$ ratio of 0.45 or greater, may be satisfied. However, when the crystallization time is 80 hours or longer, the AEI zeolite is crystallized in a form of a single phase even when the source composition does not contain a quaternary ammonium cation, or even when the OH$^-$/SiO$_2$ ratio is less than 0.45, or even when the source composition does not contain a quaternary ammonium cation and the OH$^-$/SiO$_2$ ratio is less than 0.45. The crystallization time needs to be 500 hours or shorter, 300 hours or shorter, or 200 hours or shorter.

When the OH$^-$/SiO$_2$ ratio is less than 0.45, the AEI zeolite is crystallized in a form of a single phase in the crystallization time of 120 hours or longer, or 150 hours or longer. Furthermore, when the OH$^-$/SiO$_2$ ratio is 0.45 or greater, the AEI zeolite is crystallized in a form of a single phase in the crystallization time of 75 hours or shorter, or 50 hours or shorter.

When the source composition contains a quaternary ammonium cation, the AEI zeolite can be crystallized in a shorter period of time compared to that of a known method for producing an AEI zeolite that does not use fluorine or phosphorus. Therefore, when the source composition contains a quaternary ammonium cation, the AEI zeolite can be obtained even when the crystallization time is 72 hours or shorter, or 48 hours or shorter, while almost no effect of the OH$^-$/SiO$_2$ ratio is exhibited. The obtained AEI zeolite may be subjected to disintegration or crushing as necessary.

The method for producing an AEI zeolite according to an embodiment of the present invention may also include at least one of a washing step, a drying step, an SDA removal step, and an ion exchange step after the crystallization step.

In the washing step, the AEI zeolite and the liquid phase after crystallization are subjected to solid-liquid separation. In the washing step, solid-liquid separation is performed with a known method, and the obtained AEI zeolite as a solid phase needs to be washed with purified water.

In the drying step, the water content is removed from the AEI zeolite after the crystallization step or the washing step. The conditions of the drying step are discretionary, but an example is drying the AEI zeolite after the crystallization step or the washing step by leaving the zeolite to stand or drying the zeolite with a spray dryer, for at least two hours in the atmosphere at 50° C. or higher but lower than 150° C., or 100° C. or higher but 150° C. or lower.

The SDA removal step is performed to remove the SDA contained in the AEI zeolite. Ordinarily, an AEI zeolite having been subjected to a crystallization step contains an SDA in the pores thereof. Therefore, the SDA can be removed as necessary.

The SDA removal step can be performed with any method as long as the SDA is removed. Examples of these removal methods include at least one type selected from the group consisting of liquid phase treatment using an acidic aqueous solution, exchange treatment using a resin or the like, thermolysis treatment, and calcination treatment. The SDA removal step is preferably either thermolysis treatment or calcination treatment from the perspective of production efficiency.

The AEI zeolite after crystallization may have a metal ion such as an alkali metal ion at its ion exchange site. In the ion exchange step, this is ion-exchanged with a non-metal cation such as an ammonium ion ($NH_4^+$) or a proton ($H^+$). Ion exchange to an ammonium ion may be performed by mixing and stirring AEI zeolite into an ammonium chloride aqueous solution. Furthermore, ion exchange to a proton may be performed by ion-exchanging AEI zeolite with ammonia and calcining it.

More specifically, as the ion exchange step, an ion exchange step including an ammonium treatment step and a heat treatment step is exemplified.

The ammonium treatment step is performed to remove alkali metals contained in the AEI zeolite. The ammonium treatment step may be performed with a typical method. For example, the step may be performed by bringing an aqueous solution containing ammonium ions into contact with the AEI zeolite.

In the heat treatment step, heat treatment is performed on the AEI zeolite at 400° C. or higher but 600° C. or lower. In the case of an AEI zeolite in which the cation type is an ammonium-type ($NH_4^+$ type), an AEI zeolite in which the cation type is a proton-type ($H^+$ type) is obtained by the heat treatment. An example of more specific calcination conditions is 1 to 2 hours at 500° C. in the atmosphere.

The production method according to an embodiment of the present invention has a small difference between the $SiO_2/Al_2O_3$ ratio of the source composition and the $SiO_2/Al_2O_3$ ratio of the obtained AEI zeolite compared to the difference in the case of a known method for producing an AEI zeolite via zeolite transformation. For example, in the production method according to an embodiment of the present invention, even when a source composition having a large amount of hydroxide ion, which is the $OH^-/SiO_2$ ratio of 0.49 to 0.72, is used, the $SiO_2/Al_2O_3$ ratio of the obtained AEI zeolite relative to the $SiO_2/Al_2O_3$ ratio of the source composition (hereinafter, also referred to as "SAR change percentage") is 60% or less, or 58% or less. A lower SAR change percentage enhances the efficiency of the crystallization of the AEI zeolite from the source composition. Because of this, the SAR change percentage of the production method according to an embodiment of the present invention, particularly the SAR change percentage when the $OH^-/SiO_2$ of the source composition is from 0.36 to 0.49 is preferably 55% or less, more preferably 50% or less, even more preferably 48% or less, and yet even more preferably 45% or less.

Because the SAR change percentage is low when the $OH^-/SiO_2$ ratio is high, the production method according to an embodiment of the present invention is particularly suitable as a production method for obtaining an AEI zeolite having the $SiO_2/Al_2O_3$ ratio of 50 or less, 25 or less, or from 15 to 25.

In the crystallization step, for example, the yield of the AEI zeolite determined by using the following equation is greater than 40%, 50% or greater, 70% or greater, or 75% or greater.

Yield (wt. %)=(total weight of $Al_2O_3$ and $SiO_2$ in AEI zeolite)/(total weight of $Al_2O_3$ and $SiO_2$ in source composition)×100

Note that the total weight of the $Al_2O_3$ and the $SiO_2$ of the AEI zeolite is a total weight of the weight determined by measuring the Al content in the AEI zeolite and then converting the Al content in terms of $Al_2O_3$ and the weight determined by measuring the Si content in the AEI zeolite and then converting the Si content in terms of $SiO_2$. Furthermore, the total weight of the $Al_2O_3$ and the $SiO_2$ in the source composition may be determined by the similar method.

In the present invention, the proportion of the solid content of the zeolite relative to components except water of the source composition (hereinafter, also referred to as "solid recovery percentage") is preferably high. By setting the solid recovery percentage high, the amount of unused components discharged in the production step of the production method according to an embodiment of the present invention is reduced, thereby reducing the environmental load. The solid recovery percentage is a value determined from the following equation.

Solid recovery percentage (%)=(total weight of metals in AEI zeolite in terms of oxide)/(total weight of components except water of the source composition)×100

Note that the weight, converted in terms of oxide, of the metal may be determined by converting the weight of the alkali metal, such as Si, Al, Na, and K, in terms of an alkali metal oxide, such as $SiO_2$, $Al_2O_3$, $Na_2O$, and $K_2O$.

The AEI zeolite obtained in the production method according to an embodiment of the present invention has an $SiO_2/Al_2O_3$ ratio suitable as a catalyst support, and the $SiO_2/Al_2O_3$ ratio is 100 or less, 50 or less, 30 or less, or 25 or less, and 10 or greater, 14 or greater, or 15 or greater. Examples of the particularly preferable $SiO_2/Al_2O_3$ ratio include from 10 to 100, from 14 to 50, and from 15 to 30.

The AEI zeolite obtained in the production method according to an embodiment of the present invention has the average crystal size of 0.1 μm or greater, or 0.5 μm or greater, and 5 μm or less, or 2 μm or less. Examples of the particularly preferable average crystal size is from 0.5 μm to 8 μm, and from 0.5 μm to 2 μm. As a result, deterioration is less likely to occur even when exposure to a steam atmosphere is performed. In addition, due to the average crystal size described above, the particles are less likely to be agglomerated, and enhancement of coatability to a catalyst substrate is expected.

The crystal size in the present invention is a primary particle size and is a diameter of a particle of an independent minimum unit observed with an electron microscope. The average crystal size is a value obtained by determining an arithmetic average of crystal sizes of at least 30 primary particles that are randomly chosen, by using an electron microscope. Therefore, the crystal size or the average crystal size differs from the secondary particle size or average secondary particle size, which is the diameter of secondary particles formed by agglomerate of a plurality of primary particles. The shape of the primary particle may be at least one type selected from the group consisting of a cubic crystal shape, a tetragonal crystal shape, and a twin crystal shape in which cubic crystal shapes or tetragonal crystal shapes are composited.

The filling property of the AEI zeolite can be adjusted to a certain degree depending on the condition of the crystallization step and the treatment step after the crystallization. As the filling property of the AEI zeolite of the present invention, the aerated bulk density is from 0.1 g/cm$^3$ to 1 g/cm$^3$, or 0.1 g/cm$^3$ to 0.5 g/cm$^3$. By setting the aerated bulk density to this range, the AEI zeolite has a practical filling property as a catalyst, an adsorbent, or the like. The aerated bulk density is a bulk density at the time when the AEI zeolite that has been passed through a sieve is naturally dropped into a container to fill the container. The aerated bulk density can be measured by an ordinary measurement apparatus for physical properties of powder.

The AEI zeolite obtained by the production method according to an embodiment of the present invention has sufficient acidity as an acid catalyst. The acidity is from 0.5 mmol/g to 3 mmol/g, or 1 mmol/g to 2 mmol/g.

The acidity can be determined by subjecting a proton type AEI zeolite, from which organic materials have been removed, to ammonia TPD measurement.

In the AEI zeolite obtained by the production method according to an embodiment of the present invention, the molar ratio of the silanol amount to the silicon amount (hereinafter, also referred to as "SiOH/Si ratio") is $3 \times 10^{-2}$ or less. An ideal AEI zeolite does not contain silanol; however, practically, an AEI zeolite contains silanol. Therefore, the SiOH/Si ratio is greater than 0 but $3 \times 10^{-2}$ or less, or greater than 0 but $1 \times 10^{-2}$ or less.

The silanol amount can be determined by subjecting an ammonium type AEI zeolite, from which organic materials have been removed, to NMR measurement.

The AEI zeolite obtained by the production method according to an embodiment of the present invention preferably has high heat resistance, reduces the reduction in crystallinity before and after exposure to a steam atmosphere, and reduces the reduction in crystallinity before and after exposure to a steam atmosphere compared to a known AEI zeolite obtained by using a zeolite Y as a raw material. The degree of reduction in the crystallinity due to exposure to a steam atmosphere can be indicated by the proportion of crystallinity after the exposure to the steam atmosphere relative to the crystallinity before the exposure to the steam atmosphere (hereinafter, also referred to as "maintenance ratio of crystallinity"). This can be determined by comparing the intensities of XRD peaks before and after the exposure to the steam atmosphere.

The AEI zeolite obtained by the production method according to an embodiment of the present invention can be used as a catalyst support or an adsorbent. Furthermore, by allowing the AEI zeolite obtained by the production method according to an embodiment of the present invention to contain at least one selected from the group consisting of copper and iron, it is expected that the AEI zeolite can be used as a catalyst or a nitrogen oxide reduction catalyst.

EXAMPLES

The present invention will be described in detail with reference to examples hereinafter. However, the present invention is not limited to these examples. Note that "ratio" denotes "molar ratio" unless otherwise noted.

Identification of Crystal Structure

The XRD measurement of the product was performed using a typical X-ray diffraction device (trade name: MXP-3, available from MAC Science). The measurement conditions were as follows.
Radiation source: CuKα radiation ($\lambda$=1.5405 Å)
Measurement mode: step scan
Scanning condition: 0.04°/sec
Divergence slit: 1.00 deg
Scattering slit: 1.00 deg
Receiving slit: 0.30 mm
Measurement time: 3.00 seconds
Measurement range: 2θ=3° to 43°

The identification of the crystal structure was performed by comparing the obtained XRD pattern with an XRD pattern of Table 1 of Patent Document 1.

Composition Analysis

The composition analysis was performed by an X-ray fluorescence method (XRF) or an ICP method. The composition analysis by XRF was performed by using an X-ray fluorescence spectrometer (trade name: RIX 2100, available from Rigaku Corporation). As the pre-treatment, the product was calcined at 600° C. for 1 hour. The $SiO_2/Al_2O_3$ ratio of the product was determined from the obtained analytical result. In the composition analysis by an ICP method, a sample solution was prepared by dissolving a sample in a mixed aqueous solution of hydrofluoric acid and nitric acid. Using a general ICP instrument (instrument name: OPTIMA 5300DV, available from PerkinElmer Inc.), the sample solution was measured by inductively coupled plasma atomic emission spectroscopy (ICP-AES). The $SiO_2/Al_2O_3$ ratio of the sample was determined from the obtained measured values of Si and Al.

The $SiO_2/Al_2O_3$ ratio determined by the XRF was used as the $SiO_2/Al_2O_3$ ratio (XRF), and the $SiO_2/Al_2O_3$ ratio determined by the ICP was used as the $SiO_2/Al_2O_3$ ratio (ICP).

SAR Change Percentage

The SAR change percentage was determined from the $SiO_2/Al_2O_3$ ratio obtained by the composition analysis and by using the following equation.

$$\text{SAR change percentage (\%)} = \{1-(SiO_2/Al_2O_3 \text{ ratio of product})/(SiO_2/Al_2O_3 \text{ ratio of source composition})\} \times 100$$

Yield

The yield of the AEI zeolite was determined from the following equation.

$$\text{Yield (wt. \%)} = (\text{total weight of } Al_2O_3 \text{ and } SiO_2 \text{ in AEI zeolite})/(\text{total weight of } Al_2O_3 \text{ and } SiO_2 \text{ in source composition}) \times 100$$

As the total weight of the $Al_2O_3$ and the $SiO_2$, the total of the weight determined by measuring the Al content and then converting the Al content in terms of $Al_2O_3$ and the weight determined by measuring the Si content and then converting the Si content in terms of $SiO_2$ was used.

Solid Recovery Percentage

The solid recovery percentage of the AEI zeolite was determined from the following equation.

$$\text{Solid recovery percentage (\%)} = (\text{total weight of metals in AEI zeolite in terms of corresponding oxides})/(\text{total weight of components except water of the source composition}) \times 100$$

Silanol Amount

The content of the silanol was measured by 1H MAS NMR after the synthesized AEI zeolite is calcined in the air at 600° C. for 2 hours. The conditions were as follows. Prior to measurements, the sample was dehydrated as a form of pretreatment by holding the sample for five hours at 400° C. in vacuum exhaust. After pretreatment, the sample that was cooled to room temperature was collected and weighed in a nitrogen atmosphere. A typical NMR instrument (instrument name: VXR-300S, available from Varian) was used as the measurement device.

Resonance frequency: 300.0 MHz
　　Pulse width: π/2
　　Measurement waiting time: 10 seconds
　　Integration frequency: 32 times
　　Rotational frequency: 4 kHz
　　Shift reference: TMS The peak assigned to the silanol group (peak in 2.0±0.5 ppm) was subjected to waveform separation, and the integrated intensity thereof was determined from the obtained 1H MAS NMR spectrum. The silanol amount in the sample was determined by a calibration curve method from the resulting integrated intensity.

Acidity

After the synthesized AEI zeolite was calcined in the air at 600° C. for 2 hours, the measurement was performed by the ammonia Temperature Programmed Desorption (TPD) method by using the BELCAT II, available from Microtrac-BEL Corp. Prior to the measurement, 0.05 g of an AEI zeolite was heat-treated at 500° C. in helium to remove adsorptive components, and then subjected to saturation adsorption of ammonia by circulating a mixed gas of 99% helium and 1% ammonia at 100° C. Then, the ammonia remaining in the system was removed by circulating helium gas. After the removal of the ammonia, the amount of the ammonia released from the sample when the treatment was performed in the following conditions was quantitated to determine the acidity.

Atmosphere: in helium circulation (flow rate: 30 mL/min)
　　Rate of temperature increase: 10° C./min
　　Treatment temperature: from 100° C. to 700° C.

Average Crystal Size

The crystal size and shape of the primary particles were observed by using an electron microscope (instrument name: JSM-6390LV, available from Hitachi Bunko). When the primary particle was a crystal having a cubic crystal shape, the crystal size was determined by measuring the length of one side of the crystal, and when the primary particle was a tetragonal crystal shape, the crystal size was determined by measuring the length of a side of a face of the square. The average crystal size was determined by randomly choosing at least 30 primary particles and then calculating the average of the measured values of the particle sizes.

Aerated Bulk Density

The aerated bulk density was a bulk density measured at the time when the powder sample was passed through a sieve and naturally dropped into a container to fill the container. A measurement instrument for physical properties of powder (instrument name: MULTI TESTER MT-1001, available from Seishin Enterprise Co., Ltd.) was used for the measurement.

Maintenance Ratio of Crystallinity

XRD measurement for the AEI zeolite sample before and after the hydrothermal durability treatment was performed by a method similar to that of the identification of the crystal structure. After the obtained XRD pattern was subjected to background subtraction treatment and peak search treatment, the peak intensities of the XRD peaks that correspond to 2θ=16.9±0.2° and 17.2±0.2° were summed up, and the total value was used as the crystallinity of the AEI zeolite sample. The maintenance ratio of crystallinity was calculated by using the following equation.

Maintenance ratio of crystallinity (%)=(crystallinity after hydrothermal durability treatment)/(crystallinity before hydrothermal durability treatment)×100

Example 1-1

A source composition formed from the composition shown below was obtained by mixing 9.84 g, in terms of $SiO_2$, of granular amorphous silicate, 0.37 g, in terms of $Al_2O_3$, of aluminum sulfate, 23.08 g of 21 wt. % DEDMPOH, 3.35 g of sodium hydroxide, and 20.12 g of pure water.

$SiO_2/Al_2O_3$=45
　　$Na/SiO_2$=0.56
　　$H_2O/SiO_2$=12.8
　　$DEDMPOH/SiO_2$=0.16
　　$OH^-/SiO_2$=0.72

The $(Si-Al)_{Cry}/(Si-Al)_{Total}$ of the source composition was 0 wt. %.

The obtained source composition was sealed in a stainless steel autoclave. The source composition was heated at 135° C. for 120 hours while the autoclave was rotated, to crystallize the source composition.

The obtained product was filtered, washed, and then dried overnight at 110° C. in the atmosphere. The obtained product was an AEI zeolite and was an SSZ-39 having the $SiO_2/Al_2O_3$ ratio (XRF) of 19. The yield was 45 wt. %, the solid content yield was 27%, and the SAR change percentage was 58%.

The results are shown in Table 1-1.

Example 1-2

A product was obtained by the same method as for Example 1-1 except for changing the composition of the source composition to the composition shown below and changing the crystallization temperature to 150° C.

$SiO_2/Al_2O_3$=33
　　$Na/SiO_2$=0.56
　　$H_2O/SiO_2$=19.8
　　$DEDMPOH/SiO_2$=0.16
　　$OH^-/SiO_2$=0.72

The $(Si-Al)_{Cry}/(Si-Al)_{Total}$ of the source composition was 0 wt. %.

The obtained product was an AEI zeolite and was an SSZ-39 having the $SiO_2/Al_2O_3$ ratio (XRF) of 15. The yield was 47 wt. %, the solid content yield was 29%, and the SAR change percentage was 55%. The results are shown in Table 1-1.

The average crystal size of the AEI zeolite of the present example was 1.5 μm.

Example 1-3

A source composition formed from the composition shown below was obtained by mixing 11.82 g, in terms of $SiO_2$, of granular amorphous silicate, 0.79 g, in terms of $Al_2O_3$, of aluminum sulfate, 0.57 g of AEI zeolite ($SiO_2/Al_2O_3$ ratio: 16; average particle size: 3.1 μm), 11.72 g of 53 wt. % DMDMPOH, 1.56 g of sodium hydroxide, 1.10 g of potassium hydroxide, and 30.00 g of pure water.

$SiO_2/Al_2O_3$=25
　　$Na/SiO_2$=0.20
　　$K/SiO_2$=0.10
　　$(Na+K)/SiO_2$=0.30
　　$K/Na$=0.50
　　$H_2O/SiO_2$=9.8

DMDMPOH/SiO$_2$=0.20
OH$^-$/SiO$_2$=0.50
The (Si—Al)$_{Cry}$/(Si—Al)$_{Total}$ of the source composition was 4.40 wt. %.

A product was obtained by the same method as for Example 1-1 except for using this source composition and performing the crystallization at 180° C. for 48 hours.

The obtained product was an AEI zeolite and was an SSZ-39 having the SiO$_2$/Al$_2$O$_3$ ratio (XRF) of 12. The yield was 53 wt. %, the solid content yield was 31%, and the SAR change percentage was 52%. The results are shown in Table 1-1.

Example 1-4

A product was obtained by the same method as for Example 1-3 except for using a source composition having the following composition as the source composition.
SiO$_2$/Al$_2$O$_3$=25
Na/SiO$_2$=0.20
K/SiO$_2$=0.07
(Na+K)/SiO$_2$=0.27
K/Na=0.35
H$_2$O/SiO$_2$=9.8
DMDMPOH/SiO$_2$=0.20
OH$^-$/SiO$_2$=0.47
The (Si—Al)$_{Cry}$/(Si—Al)$_{Total}$ of the source composition was 4.49 wt. %.

The obtained product was an AEI zeolite and was an SSZ-39 having the SiO$_2$/Al$_2$O$_3$ ratio (XRF) of 13. The yield was 57 wt. %, the solid content yield was 34%, and the SAR change percentage was 48%. The results are shown in Table 1-1.

Example 1-5

A product was obtained by the same method as for Example 1-3 except for using a source composition having the following composition as the source composition.
SiO$_2$/Al$_2$O$_3$=25
Na/SiO$_2$=0.20
K/SiO$_2$=0.05
(Na+K)/SiO$_2$=0.25
K/Na=0.25
H$_2$O/SiO$_2$=9.8
DMDMPOH/SiO$_2$=0.20
OH$^-$/SiO$_2$=0.45
The (Si—Al)$_{Cry}$/(Si—Al)$_{Total}$ of the source composition was 4.40 wt. %.

The obtained product was an AEI zeolite and was an SSZ-39 having the SiO$_2$/Al$_2$O$_3$ ratio (XRF) of 14. The yield was 59 wt. %, the solid content yield was 37%, and the SAR change percentage was 44%. The results are shown in Table 1-1.

Example 1-6

A product was obtained by the same method as for Example 1-3 except for using a source composition having the following composition as the source composition.
SiO$_2$/Al$_2$O$_3$=25
Na/SiO$_2$=0.18
K/SiO$_2$=0.07
(Na+K)/SiO$_2$=0.25
K/Na=0.39
H$_2$O/SiO$_2$=9.8
DMDMPOH/SiO$_2$=0.20
OH$^-$/SiO$_2$=0.45
The (Si—Al)$_{Cry}$/(Si—Al)$_{Total}$ of the source composition was 4.40 wt. %.

The obtained product was an AEI zeolite and was an SSZ-39 having the SiO$_2$/Al$_2$O$_3$ ratio (XRF) of 14. The yield was 59 wt. %, the solid content yield was 37%, and the SAR change percentage was 44%. The results are shown in Table 1-1.

Example 1-7

A product was obtained by the same method as for Example 1-3 except for using a source composition having the following composition as the source composition.
SiO$_2$/Al$_2$O$_3$=25
Na/SiO$_2$=0.24
K/SiO$_2$=0.03
(Na+K)/SiO$_2$=0.27
K/Na=0.13
H$_2$O/SiO$_2$=9.8
DMDMPOH/SiO$_2$=0.20
OH$^-$/SiO$_2$=0.47
The (Si—Al)$_{Cry}$/(Si—Al)$_{Total}$ of the source composition was 4.40 wt. %.

The obtained product was an AEI zeolite and was an SSZ-39 having the SiO$_2$/Al$_2$O$_3$ ratio (XRF) of 14. The yield was 58 wt. %, the solid content yield was 36%, and the SAR change percentage was 44%. The results are shown in Table 1-1.

Example 1-8

A product was obtained by the same method as for Example 1-3 except for using a source composition having the following composition as the source composition.
SiO$_2$/Al$_2$O$_3$=31
Na/SiO$_2$=0.22
K/SiO$_2$=0.05
(Na+K)/SiO$_2$=0.27
K/Na=0.23
H$_2$O/SiO$_2$=9.8
DMDMPOH/SiO$_2$=0.20
OH$^-$/SiO$_2$=0.47
The (Si—Al)$_{Cry}$/(Si—Al)$_{Total}$ of the source composition was 4.40 wt. %.

The obtained product was an AEI zeolite and was an SSZ-39 having the SiO$_2$/Al$_2$O$_3$ ratio (XRF) of 17. The yield was 56 wt. %, the solid content yield was 35%, and the SAR change percentage was 45%. The results are shown in Table 1-1.

Example 1-9

A product was obtained by the same method as for Example 1-3 except for using a source composition having the following composition as the source composition.
SiO$_2$/Al$_2$O$_3$=36
Na/SiO$_2$=0.24
K/SiO$_2$=0.09
(Na+K)/SiO$_2$=0.33
K/Na=0.38
H$_2$O/SiO$_2$=9.8
DMDMPOH/SiO$_2$=0.16
OH$^-$/SiO$_2$=0.49
The (Si—Al)$_{Cry}$/(Si—Al)$_{Total}$ of the source composition was 4.40 wt. %.

The obtained product was an AEI zeolite and was an SSZ-39 having the $SiO_2/Al_2O_3$ ratio (XRF) of 17. The yield was 49 wt. %, the solid content yield was 32%, and the SAR change percentage was 53%. The results are shown in Table 1-1.

Example 1-10

A product was obtained by the same method as for Example 1-3 except for using a source composition having the following composition as the source composition.
$SiO_2/Al_2O_3$=43
$Na/SiO_2$=0.20
$K/SiO_2$=0.09
$(Na+K)/SiO_2$=0.29
$K/Na$=0.45
$H_2O/SiO_2$=9.8
$DMDMPOH/SiO_2$=0.20
$OH^-/SiO_2$=0.49
The $(Si-Al)_{Cry}/(Si-Al)_{Total}$ of the source composition was 4.40 wt. %.

The obtained product was an AEI zeolite and was an SSZ-39 having the $SiO_2/Al_2O_3$ ratio (XRF) of 18. The yield was 43 wt. %, the solid content yield was 26%, and the SAR change percentage was 58%. The results are shown in Table 1-1.

Example 1-11

A source composition formed from the composition shown below was obtained by mixing 12.88 g of amorphous aluminosilicate ($SiO_2/Al_2O_3$ ratio: 27), 0.57 g of AEI zeolite ($SiO_2/Al_2O_3$ ratio: 16; average particle size: 3.1 μm), 6.42 g of DMDMPOH, 0.94 g of sodium hydroxide, 0.45 g of potassium hydroxide, and 36.48 g of pure water.
$SiO_2/Al_2O_3$=27
$Na/SiO_2$=0.13
$K/SiO_2$=0.03
$(Na+K)/SiO_2$=0.16
$K/Na$=0.23
$H_2O/SiO_2$=9.8
$DMDMPOH/SiO_2$=0.20
$OH^-/SiO_2$=0.36
The $(Si-Al)_{Cry}/(Si-Al)_{Total}$ of the source composition was 4.31 wt. %.

A product was obtained by the same method as for Example 1-1 except for using this source composition and performing the crystallization at 170° C. for 168 hours.

The obtained product was an AEI zeolite and was an SSZ-39 having the $SiO_2/Al_2O_3$ ratio (XRF) of 18. The yield was 69 wt. %, the solid content yield was 42%, and the SAR change percentage was 33%. The results are shown in Table 1-1.

Example 1-12

A source composition formed from the composition shown below was obtained by mixing 7.84 g of amorphous aluminosilicate ($SiO_2/Al_2O_3$ ratio: 33), 16.92 g of 21 wt. % DEDMPOH, 2.36 g of sodium hydroxide, and 29.88 g of pure water.
$SiO_2/Al_2O_3$=33
$Na/SiO_2$=0.56
$H_2O/SiO_2$=20
$DEDMPOH/SiO_2$=0.16
$OH^-/SiO_2$=0.72

The $(Si-Al)_{Cry}/(Si-Al)_{Total}$ of the source composition was 0 wt. %.

The obtained source composition was sealed in a stainless steel autoclave. The source composition was heated at 150° C. for 72 hours while the autoclave was rotated, to crystallize the source composition.

The obtained product was filtered, washed, and then dried overnight at 110° C. in the atmosphere. The obtained product was an AEI zeolite and was an SSZ-39 having the $SiO_2/Al_2O_3$ ratio (XRF) of 15. The yield was 49 wt. %, the solid content yield was 29%, and the SAR change percentage was 54%. The results are shown in Table 1-1.

The average crystal size of the AEI zeolite of the present example was 0.85 μm.

Example 1-13

A source composition formed from the composition shown below was obtained by mixing 12.47 g of amorphous aluminosilicate ($SiO_2/Al_2O_3$ ratio: 39), 0.73 g of AEI zeolite ($SiO_2/Al_2O_3$ ratio: 18; average particle size: 3.1 μm), 11.82 g of 53 wt. % DMDMPOH, 1.88 g of sodium hydroxide, 0.56 g of potassium hydroxide, and 30.27 g of pure water.
$SiO_2/Al_2O_3$=37
$Na/SiO_2$=0.24
$K/SiO_2$=0.05
$(Na+K)/SiO_2$=0.29
$K/Na$=0.21
$H_2O/SiO_2$=10
$DMDMPOH/SiO_2$=0.20
$OH^-/SiO_2$=0.49
The $(Si-Al)_{Cry}/(Si-Al)_{Total}$ of the source composition was 4.40 wt. %.

A product was obtained by the same method as for Example 1-1 except for using this source composition and performing the crystallization at 170° C. for 36 hours.

The obtained product was an AEI zeolite and was an SSZ-39 having the $SiO_2/Al_2O_3$ ratio (XRF) of 19 and having the $SiO_2/Al_2O_3$ ratio (ICP) of 19. The yield was 53 wt. %, the solid recovery percentage was 31%, and the SAR change percentage was 50%. The results are shown in Table 1-1.

The AEI zeolite of the present example had the silanol amount of $SiOH/Si=0.60\times10^{-2}$ and the acidity of 1.72 mmol/g.

Example 1-14

A source composition formed from the composition shown below was obtained by mixing 12.38 g of amorphous aluminosilicate ($SiO_2/Al_2O_3$ ratio: 41), 0.73 g of AEI zeolite ($SiO_2/Al_2O_3$ ratio: 18; average particle size: 3.1 μm), 11.77 g of 53 wt. % DMDMPOH, 1.73 g of sodium hydroxide, 1.00 g of potassium hydroxide, and 30.13 g of pure water.
$SiO_2/Al_2O_3$=39
$Na/SiO_2$=0.22
$K/SiO_2$=0.09
$(Na+K)/SiO_2$=0.31
$K/Na$=0.41
$H_2O/SiO_2$=10
$DMDMPOH/SiO_2$=0.20
$OH^-/SiO_2$=0.51
The $(Si-Al)_{Cry}/(Si-Al)_{Total}$ of the source composition was 4.40 wt. %.

A product was obtained by the same method as for Example 1-1 except for using this source composition and performing the crystallization at 170° C. for 24 hours.

The obtained product was an AEI zeolite and was an SSZ-39 having the $SiO_2/Al_2O_3$ ratio (XRF) of 18. The yield was 48 wt. %, the solid content yield was 27%, and the SAR change percentage was 55%. The results are shown in Table 1-1.

Example 1-15

A source composition formed from the composition shown below was obtained by mixing 12.62 g of amorphous aluminosilicate ($SiO_2/Al_2O_3$ ratio: 29), 0.74 g of AEI zeolite ($SiO_2/Al_2O_3$ ratio: 18; average particle size: 3.1 m), 11.80 g of 53 wt. % DMDMPOH, 1.58 g of sodium hydroxide, 0.78 g of potassium hydroxide, and 30.22 g of pure water.
$SiO_2/Al_2O_3=28$
$Na/SiO_2=0.20$
$K/SiO_2=0.07$
$(Na+K)/SiO_2=0.27$
$K/Na=0.35$
$H_2O/SiO_2=10$
$DMDMPOH/SiO_2=0.20$
$OH^-/SiO_2=0.47$
The $(Si—Al)_{Cry}/(Si—Al)_{Total}$ of the source composition was 4.40 wt. %.

A product was obtained by the same method as for Example 1-1 except for using this source composition and performing the crystallization at 170° C. for 48 hours.

The obtained product was an AEI zeolite and was an SSZ-39 having the $SiO_2/Al_2O_3$ ratio (XRF) of 15. The yield was 57 wt. %, the solid content yield was 35%, and the SAR change percentage was 46%. The results are shown in Table 1-1.

The average crystal size of the AEI zeolite of the present example was 1.8 μm.

Example 1-16

A source composition formed from the composition shown below was obtained by mixing 12.39 g of amorphous aluminosilicate ($SiO_2/Al_2O_3$ ratio: 41), 0.73 g of AEI zeolite ($SiO_2/Al_2O_3$ ratio: 18; average particle size: 3.1 μm), 11.77 g of 53 wt. % DMDMPOH, 1.71 g of sodium hydroxide, 1.00 g of potassium hydroxide, and 30.13 g of pure water.
$SiO_2/Al_2O_3=39$
$Na/SiO_2=0.22$
$K/SiO_2=0.09$
$(Na+K)/SiO_2=0.31$
$K/Na=0.41$
$H_2O/SiO_2=10$
$DMDMPOH/SiO_2=0.20$
$OH^-/SiO_2=0.51$
The $(Si—Al)_{Cry}/(Si—Al)_{Total}$ of the source composition was 4.40 wt. %.

A product was obtained by the same method as for Example 1-1 except for using this source composition and performing the crystallization at 170° C. for 36 hours.

The obtained product was an AEI zeolite and was an SSZ-39 having the $SiO_2/Al_2O_3$ ratio (XRF) of 17. The yield was 47 wt. %, the solid content yield was 27%, and the SAR change percentage was 55%. The results are shown in Table 1-1.

The aerated bulk density of the AEI zeolite of the present example was 0.34 g/cm³.

Comparative Example 1-1

Production of an AEI zeolite by inducing a structural transformation of a crystalline aluminosilicate having a Y-structure was performed by using the examples of U.S. Pat. No. 5,958,370 as a reference. That is, a source composition formed from the composition shown below was obtained by mixing 3.28 g, in terms of $SiO_2$, of sodium silicate aqueous solution, 0.82 g of zeolite Y ($SiO_2/Al_2O_3$ ratio: 6), 8.69 g of 21 wt. % DEDMPOH aqueous solution, and 36.28 g of pure water.
$SiO_2/Al_2O_3=50$
$Na/SiO_2=0.56$
$H_2O/SiO_2=44.8$
$DEDMPOH/SiO_2=0.16$
$OH^-/SiO_2=0.72$
The $(Si—Al)_{Cry}/(Si—Al)_{Total}$ of the source composition was 11.50 wt. %.

The obtained source composition was sealed in a stainless steel autoclave and heated for 135° C. for 168 hours while the autoclave was rotated, to obtain a product.

The obtained product was filtered, washed, and then dried overnight at 110° C. in the atmosphere. The obtained product was an AEI zeolite and was an SSZ-39 having the $SiO_2/Al_2O_3$ ratio (XRF) of 19. The yield was 40 wt. %, the solid content yield was 24%, and the SAR change percentage was 62%. The results are shown in Table 1-1.

Comparative Example 1-2

A source composition formed from the composition shown below was obtained by mixing 6.47 g, in terms of $SiO_2$, of sodium silicate aqueous solution, 1.61 g of zeolite Y ($SiO_2/Al_2O_3$ ratio: 6), 17.15 g of 21 wt. % DEDMPOH, and 16.13 g of pure water.
$SiO_2/Al_2O_3=50$
$Na/SiO_2=0.56$
$H_2O/SiO_2=19.8$
$DEDMPOH/SiO_2=0.16$
$OH^-/SiO_2=0.72$
The $(Si—Al)_{Cry}/(Si—Al)_{Total}$ of the source composition was 11.50 wt. %.

The obtained source composition was sealed in a stainless steel autoclave and heated for 135° C. for 168 hours while the autoclave was rotated, to obtain a product.

The product was filtered, washed, and then dried overnight at 110° C. in the atmosphere. The obtained product was an AEI zeolite and was an SSZ-39 having the $SiO_2/Al_2O_3$ ratio (XRF) of 16. Furthermore, the yield was 35 wt. %, the solid content yield was 21%, and the SAR change percentage was 68%. The results are shown in Table 1-1.

The average crystal size of the AEI zeolite of the present comparative example was 0.99 μm.

Comparative Example 1-3

A source composition formed from the composition shown below was obtained by mixing 2.75 g, in terms of $SiO_2$, of sodium silicate aqueous solution, 2.78 g of zeolite Y ($SiO_2/Al_2O_3$ ratio: 29), 7.42 g of 34 wt. % DMDMPOH, 0.61 g of sodium hydroxide, and 36.82 g of pure water.
$SiO_2/Al_2O_3=60$
$Na/SiO_2=0.49$
$H_2O/SiO_2=29.8$
$DMDMPOH/SiO_2=0.18$
$OH^-/SiO_2=0.67$
The $(Si—Al)_{Cry}/(Si—Al)_{Total}$ of the source composition was 42.69 wt. %.

The obtained source composition was sealed in a stainless steel autoclave and heated for 145° C. for 94 hours while the autoclave was rotated, to obtain a product.

The product was filtered, washed, and then dried overnight at 110° C. in the atmosphere. The obtained product was an AEI zeolite and was an SSZ-39 having the $SiO_2/Al_2O_3$ ratio (XRF) of 18. The yield was 32 wt. %, the solid recovery percentage was 19%, and the SAR change percentage was 70%. The results are shown in Table 1-1.

Comparative Example 1-4

A product was obtained by the same method as for Example 1-11 except for changing the crystallization time to 75 hours. The obtained product was only amorphous, and the AEI zeolite was not obtained. The results are shown in Table 1-1.

TABLE 1-1

| | Source composition | | | SAR |
|---|---|---|---|---|
| | $SiO_2/Al_2O_3$ ratio | $(Si-Al)_{Crystal}/(Si-Al)_{Total}$ (wt. %) | $SiO_2/Al_2O_3$ ratio of AEI zeolite | change percentage (%) |
| Example 1-1 | 45 | 0 | 19 | 58 |
| Example 1-2 | 33 | 0 | 15 | 55 |
| Example 1-3 | 25 | 4.40 | 12 | 52 |
| Example 1-4 | 25 | 4.49 | 13 | 48 |
| Example 1-5 | 25 | 4.40 | 14 | 44 |
| Example 1-6 | 25 | 4.40 | 14 | 44 |
| Example 1-7 | 25 | 4.40 | 14 | 44 |
| Example 1-8 | 31 | 4.40 | 17 | 45 |
| Example 1-9 | 36 | 4.40 | 17 | 53 |
| Example 1-10 | 43 | 4.40 | 18 | 58 |
| Example 1-11 | 27 | 4.31 | 18 | 33 |
| Example 1-12 | 33 | 0 | 15 | 54 |
| Example 1-13 | 37 | 4.40 | 19 | 50 |
| Example 1-14 | 39 | 4.40 | 18 | 55 |
| Example 1-15 | 28 | 4.40 | 15 | 46 |
| Example 1-16 | 39 | 4.40 | 17 | 55 |
| Comparative Example 1-1 | 50 | 11.50 | 19 | 62 |
| Comparative Example 1-2 | 50 | 11.50 | 16 | 68 |
| Comparative Example 1-3 | 60 | 42.69 | 18 | 70 |
| Comparative Example 1-4 | 27 | 4.31 | | |

By the production method according to an embodiment of the present invention, it was confirmed that an AEI zeolite can be produced from an amorphous aluminum compound without inducing a structural transformation of a zeolite Y. Furthermore, it was confirmed that, even when a small amount of crystalline aluminosilicate is contained, an AEI zeolite can be produced from an amorphous aluminum compound. Furthermore, in the production method according to an embodiment of the present invention, the SAR change percentage of the source composition and the AEI zeolite was 60% or less, 50% or less, or 45% or less. As a result, it was confirmed that the silica source and the alumina source used as the raw materials were efficiently used compared to the case of the method for producing an AEI zeolite by inducing a structural transformation of the zeolite Y as shown in comparative examples.

Example 2-1

A source composition formed from the composition shown below was obtained by mixing pure water, sodium hydroxide, potassium hydroxide, amorphous aluminosilicate, a DMDMPOH aqueous solution, (2-hydroxyethyl)trimethylammonium chloride, and an AEI zeolite ($SiO_2/Al_2O_3$ ratio: 16; average particle size: 3.1 μm).

$SiO_2/Al_2O_3$ ratio: 23
$Na/SiO_2$ ratio: 0.12
$K/SiO_2$ ratio: 0.04
$(Na+K)/SiO_2$ ratio: 0.16
K/Na ratio: 0.33
$DMDMPOH/SiO_2$ ratio: 0.2
2-HETMA/$SiO_2$ ratio: 0.03
$H_2O/SiO_2$ ratio: 10
$OH^-/SiO_2$ ratio: 0.36

The content of the AEI zeolite of the source composition was 9.1 wt. %, and this was 10 wt. % in terms of the weight proportion of the Al and the Si of the AEI zeolite relative to the total weight of the Al and the Si of the amorphous aluminosilicate.

The source composition was filled in a container and then the container was tightly closed, and the source composition was crystallized at 170° C. for 48 hours while being agitated. The obtained crystallized product was subjected to solid-liquid separation and washed with pure water, and then dried at 110° C. As a result of the XRD measurement, this crystallized product was an AEI zeolite, and the yield was 80%. The $SiO_2/Al_2O_3$ ratio (ICP) of the AEI zeolite of the present example was 18, and the SAR change percentage was 22%. The structural formula of the quaternary ammonium cation used in the present example is shown in Table 2-1. Furthermore, the major composition and results of the source composition of the present example is shown in Table 2-2.

The average crystal size of the AEI zeolite of the present example was 0.55 μm.

Example 2-2

A crystallized product was obtained by the same method as for Example 2-1 except for using a source composition having the following composition.

$SiO_2/Al_2O_3$ ratio: 25
$Na/SiO_2$ ratio: 0.15
$K/SiO_2$ ratio: 0.01
$(Na+K)/SiO_2$ ratio: 0.16
K/Na ratio: 0.07
$DMDMPOH/SiO_2$ ratio: 0.2
2-HETMA/$SiO_2$ ratio: 0.03
$H_2O/SiO_2$ ratio: 10
$OH^-/SiO_2$ ratio: 0.36

The content of the AEI zeolite of the source composition was 4.8 wt. %, and this was 5 wt. % in terms of the weight proportion of the Al and the Si of the AEI zeolite relative to the total weight of the Al and the Si of the amorphous aluminosilicate.

The obtained crystallized product was an AEI zeolite, and the yield was 76%. Furthermore, the $SiO_2/Al_2O_3$ ratio (ICP) was 19, and the SAR change percentage was 24%. The structural formula of the quaternary ammonium cation used in the present example is shown in Table 2-1. Furthermore, the major composition and results of the source composition of the present example is shown in Table 2-2.

Example 2-3

The crystallization was performed by the same method as for Example 2-1 except for using (2-hydroxyethyl)trimethylammonium hydroxide in place of the (2-hydroxyethyl)trimethylammonium chloride and changing the composition of the source composition to the following composition. Then, the obtained crystallized product was washed and dried.

SiO$_2$/Al$_2$O$_3$ ratio: 25
Na/SiO$_2$ ratio: 0.12
K/SiO$_2$ ratio: 0.04
(Na+K)/SiO$_2$ ratio: 0.16
K/Na ratio: 0.33
DMDMPOH/SiO$_2$ ratio: 0.2
2-HETMA/SiO$_2$ ratio: 0.03
H$_2$O/SiO$_2$ ratio: 10
OH$^-$/SiO$_2$ ratio: 0.36

The content of the AEI zeolite of the source composition was 9.1 wt. %, and this was 10 wt. % in terms of the weight proportion of the Al and the Si of the AEI zeolite relative to the total weight of the Al and the Si of the amorphous aluminosilicate.

The obtained crystallized product was an AEI zeolite, and the yield was 76%. The obtained crystallized product was an SSZ-39 having the SiO$_2$/Al$_2$O$_3$ ratio (ICP) of 18, and the SAR change percentage was 28%. The structural formula of the quaternary ammonium cation used in the present example is shown in Table 2-1. Furthermore, the major composition and results of the source composition of the present example is shown in Table 2-2.

Example 2-4

The crystallization was performed by the same method as for Example 2-1 except for using tetramethylammonium hydroxide in place of the (2-hydroxyethyl)trimethylammonium chloride and changing the composition of the source composition to the following composition. Then, the obtained crystallized product was washed and dried.
SiO$_2$/Al$_2$O$_3$ ratio: 25
Na/SiO$_2$ ratio: 0.12
K/SiO$_2$ ratio: 0.01
(Na+K)/SiO$_2$ ratio: 0.13
K/Na ratio: 0.08
DMDMPOH/SiO$_2$ ratio: 0.2
TMA/SiO$_2$ ratio: 0.03
H$_2$O/SiO$_2$ ratio: 10
OH$^-$/SiO$_2$ ratio: 0.36

The content of the AEI zeolite of the source composition was 4.8 wt. %, and this was 5 wt. % in terms of the weight proportion of the Al and the Si of the AEI zeolite relative to the total weight of the Al and the Si of the amorphous aluminosilicate.

The obtained crystallized product was an AEI zeolite, and the yield was 71%. The structural formula of the quaternary ammonium cation used in the present example is shown in Table 2-1. Furthermore, the major composition and results of the source composition of the present example is shown in Table 2-2.

Example 2-5

The crystallization was performed by the same method as for Example 2-1 except for using tetramethylammonium chloride in place of the (2-hydroxyethyl)trimethylammonium chloride and changing the composition of the source composition to the following composition. Then, the obtained crystallized product was washed and dried.
SiO$_2$/Al$_2$O$_3$ ratio: 27
Na/SiO$_2$ ratio: 0.12
K/SiO$_2$ ratio: 0.04
(Na+K)/SiO$_2$ ratio: 0.16
K/Na ratio: 0.33
DMDMPOH/SiO$_2$ ratio: 0.2
TMA/SiO$_2$ ratio: 0.015
H$_2$O/SiO$_2$ ratio: 10
OH$^-$/SiO$_2$ ratio: 0.36

The content of the AEI zeolite of the source composition was 4.8 wt. %, and this was 5 wt. % in terms of the weight proportion of the Al and the Si of the AEI zeolite relative to the total weight of the Al and the Si of the amorphous aluminosilicate.

The obtained crystallized product was an AEI zeolite, and the yield was 71%. The structural formula of the quaternary ammonium cation used in the present example is shown in Table 2-1. Furthermore, the major composition and results of the source composition of the present example is shown in Table 2-2.

Example 2-6

The crystallization was performed by the same method as for Example 2-1 except for using (2-hydroxypropyl)trimethylammonium chloride in place of the (2-hydroxyethyl)trimethylammonium chloride and changing the composition of the source composition to the following composition. Then, the obtained crystallized product was washed and dried.
SiO$_2$/Al$_2$O$_3$ ratio: 27
Na/SiO$_2$ ratio: 0.12
K/SiO$_2$ ratio: 0.04
(Na+K)/SiO$_2$ ratio: 0.16
K/Na ratio: 0.33
DMDMPOH/SiO$_2$ ratio: 0.2
2-HPTMA/SiO$_2$ ratio: 0.05
H$_2$O/SiO$_2$ ratio: 10
OH$^-$/SiO$_2$ ratio: 0.36

The content of the AEI zeolite of the source composition was 4.8 wt. %, and this was 5 wt. % in terms of the weight proportion of the Al and the Si of the AEI zeolite relative to the total weight of the Al and the Si of the amorphous aluminosilicate.

The obtained crystallized product was an AEI zeolite, and the yield was 73%. The structural formula of the quaternary ammonium cation used in the present example is shown in Table 2-1. Furthermore, the major composition and results of the source composition of the present example is shown in Table 2-2.

Example 2-7

The crystallization was performed by the same method as for Example 2-1 except for using ethyltrimethylammonium bromide in place of the (2-hydroxyethyl)trimethylammonium chloride and changing the composition of the source composition to the following composition. Then, the obtained crystallized product was washed and dried.
SiO$_2$/Al$_2$O$_3$ ratio: 27
Na/SiO$_2$ ratio: 0.12
K/SiO$_2$ ratio: 0.04
(Na+K)/SiO$_2$ ratio: 0.16
K/Na ratio: 0.33
DMDMPOH/SiO$_2$ ratio: 0.2
TMA/SiO$_2$ ratio: 0.05
H$_2$O/SiO$_2$ ratio: 10
OH$^-$/SiO$_2$ ratio: 0.36

The content of the AEI zeolite of the source composition was 4.8 wt. %, and this was 5 wt. % in terms of the weight proportion of the Al and the Si of the AEI zeolite relative to the total weight of the Al and the Si of the amorphous aluminosilicate.

The obtained crystallized product was an AEI zeolite, and the yield was 71%. The structural formula of the quaternary ammonium cation used in the present example is shown in Table 2-1. Furthermore, the major composition and results of the source composition of the present example is shown in Table 2-2.

Example 2-8

The crystallization was performed by the same method as for Example 2-1 except for changing the composition of the source composition to the following composition. Then, the obtained crystallized product was washed and dried.
$SiO_2/Al_2O_3$ ratio: 36
$Na/SiO_2$ ratio: 0.12
$K/SiO_2$ ratio: 0.04
$(Na+K)/SiO_2$ ratio: 0.16
$K/Na$ ratio: 0.33
$DMDMPOH/SiO_2$ ratio: 0.2
$2\text{-HETMA}/SiO_2$ ratio: 0.03
$H_2O/SiO_2$ ratio: 10
$OH^-/SiO_2$ ratio: 0.36

The content of the AEI zeolite of the source composition was 9.1 wt. %, and this was 10 wt. % in terms of the weight proportion of the Al and the Si of the AEI zeolite relative to the total weight of the Al and the Si of the amorphous aluminosilicate.

The obtained crystallized product was an AEI zeolite, and the yield was 71%. Furthermore, this AEI zeolite was an SSZ-39 having the $SiO_2/Al_2O_3$ ratio (ICP) of 25, and the SAR change percentage was 31%. The structural formula of the quaternary ammonium cation used in the present example is shown in Table 2-1. Furthermore, the major composition and results of the source composition of the present example is shown in Table 2-2.

Example 2-9

The crystallization was performed by the same method as for Example 2-1 except for changing the composition of the source composition to the following composition. Then, the obtained crystallized product was washed and dried.
$SiO_2/Al_2O_3$ ratio: 20
$Na/SiO_2$ ratio: 0.15
$K/SiO_2$ ratio: 0.01
$(Na+K)/SiO_2$ ratio: 0.16
$K/Na$ ratio: 0.07
$DMDMPOH/SiO_2$ ratio: 0.2
$2\text{-HETMA}/SiO_2$ ratio: 0.03
$H_2O/SiO_2$ ratio: 10
$OH^-/SiO_2$ ratio: 0.36

The content of the AEI zeolite of the source composition was 9.1 wt. %, and this was 10 wt. % in terms of the weight proportion of the Al and the Si of the AEI zeolite relative to the total weight of the Al and the Si of the amorphous aluminosilicate.

The obtained crystallized product was an AEI zeolite, and the yield was 79%. The structural formula of the quaternary ammonium cation used in the present example is shown in Table 2-1. Furthermore, the major composition and results of the source composition of the present example is shown in Table 2-2.

Example 2-10

The crystallization was performed by the same method as for Example 2-1 except for using tetramethylammonium chloride in place of the (2-hydroxyethyl)trimethylammonium chloride and changing the composition of the source composition to the following composition. Then, the obtained crystallized product was washed and dried.
$SiO_2/Al_2O_3$ ratio: 25
$Na/SiO_2$ ratio: 0.16
$K/SiO_2$ ratio: 0.04
$(Na+K)/SiO_2$ ratio: 0.20
$K/Na$ ratio: 0.25
$DMDMPOH/SiO_2$ ratio: 0.22
$TMA/SiO_2$ ratio: 0.002
$H_2O/SiO_2$ ratio: 10
$OH^-/SiO_2$ ratio: 0.42

The content of the AEI zeolite of the source composition was 4.8 wt. %, and this was 5 wt. % in terms of the weight proportion of the Al and the Si of the AEI zeolite relative to the total weight of the Al and the Si of the amorphous aluminosilicate.

The obtained crystallized product was an AEI zeolite, and the yield was 70%. The structural formula of the quaternary ammonium cation used in the present example is shown in Table 2-1. Furthermore, the major composition and results of the source composition of the present example is shown in Table 2-2.

Example 2-11

The crystallization was performed by the same method as for Example 2-1 except for using a CHA zeolite ($SiO_2/Al_2O_3$ ratio: 20; average particle size: 1.3 μm) in place of the AEI zeolite and changing the composition of the source composition to the following composition. Then, the obtained crystallized product was washed and dried.
$SiO_2/Al_2O_3$ ratio: 26
$Na/SiO_2$ ratio: 0.16
$K/SiO_2$ ratio: 0.04
$(Na+K)/SiO_2$ ratio: 0.20
$K/Na$ ratio: 0.25
$DMDMPOH/SiO_2$ ratio: 0.22
$2\text{-HETMA}/SiO_2$ ratio: 0.015
$H_2O/SiO_2$ ratio: 13
$OH^-/SiO_2$ ratio: 0.40

The content of the CHA zeolite of the source composition was 4.8 wt. %, and this was 5 wt. % in terms of the weight proportion of the Al and the Si of the CHA zeolite relative to the total weight of the Al and the Si of the amorphous aluminosilicate.

The obtained crystallized product was an AEI zeolite, and the yield was 71%. Furthermore, this AEI zeolite was an SSZ-39 having the $SiO_2/Al_2O_3$ ratio (ICP) of 18, the $SiO_2/Al_2O_3$ ratio (XRF) of 18, and the SAR change percentage was 31%. The structural formula of the quaternary ammonium cation used in the present example is shown in Table 2-1. Furthermore, the major composition and results of the source composition of the present example is shown in Table 2-2.

The AEI zeolite of the present example had the average crystal size of 0.76 μm, the silanol amount of $SiOH/Si=0.95\times10^{-2}$ and the acidity of 1.54 mmol/g.

Example 2-12

The crystallization was performed by the same method as for Example 2-1 except for using tetramethylammonium chloride in place of the (2-hydroxyethyl)trimethylammonium chloride, using a CHA zeolite ($SiO_2/Al_2O_3$ ratio: 20; average crystal size: 1.3 μm) in place of the AEI zeolite, and changing the composition of the source composition to the following composition. Then, the obtained crystallized product was washed and dried.
SiO$_2$/Al$_2$O$_3$ ratio: 26
Na/SiO$_2$ ratio: 0.16
K/SiO$_2$ ratio: 0.04
(Na+K)/SiO$_2$ ratio: 0.20
K/Na ratio: 0.25
DMDMPOH/SiO$_2$ ratio: 0.22
TMA/SiO$_2$ ratio: 0.002
H$_2$O/SiO$_2$ ratio: 10
OH$^-$/SiO$_2$ ratio: 0.42

The content of the CHA zeolite of the source composition was 4.8 wt. %, and this was 5 wt. % in terms of the weight proportion of the Al and the Si of the CHA zeolite relative to the total weight of the Al and the Si of the amorphous aluminosilicate.

The obtained crystallized product was an AEI zeolite, and the yield was 70%. Furthermore, this AEI zeolite was an SSZ-39 having the SiO$_2$/Al$_2$O$_3$ ratio (ICP) of 18, the SiO$_2$/Al$_2$O$_3$ ratio (XRF) of 18, and the SAR change percentage was 31%. The structural formula of the quaternary ammonium cation used in the present example is shown in Table 2-1. Furthermore, the major composition and results of the source composition of the present example is shown in Table 2-2.

The AEI zeolite of the present example had the average crystal size of 0.76 μm, the silanol amount of SiOH/Si=0.92×10$^{-2}$, the acidity of 1.41 mmol/g, and the aerated bulk density of 0.16 g/cm$^3$.

Example 2-13

The crystallization was performed by the same method as for Example 2-1 except for changing the composition of the source composition to the following composition. Then, the obtained crystallized product was washed and dried.
SiO$_2$/Al$_2$O$_3$ ratio: 24
Na/SiO$_2$ ratio: 0.12
K/SiO$_2$ ratio: 0.04
(Na+K)/SiO$_2$ ratio: 0.16
K/Na ratio: 0.33
DMDMPOH/SiO$_2$ ratio: 0.2
2-HETMA/SiO$_2$ ratio: 0.03
H$_2$O/SiO$_2$ ratio: 13
OH$^-$/SiO$_2$ ratio: 0.36

The content of the AEI zeolite of the source composition was 9.1 wt. %, and this was 10 wt. % in terms of the weight proportion of the Al and the Si of the AEI zeolite relative to the total weight of the Al and the Si of the amorphous aluminosilicate.

The obtained crystallized product was an AEI zeolite, and the yield was 80%. Furthermore, this AEI zeolite was an SSZ-39 having the SiO$_2$/Al$_2$O$_3$ ratio (ICP) of 19, and the SAR change percentage was 21%. The structural formula of the quaternary ammonium cation used in the present example is shown in Table 2-1. Furthermore, the major composition and results of the source composition of the present example is shown in Table 2-2.

TABLE 2-1

| | Quaternary ammonium cation |
|---|---|
| Example 2-1 | 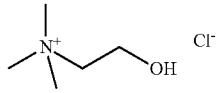 |
| Example 2-2 | 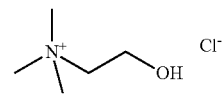 |
| Example 2-3 | 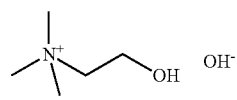 |
| Example 2-4 | 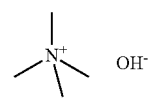 |
| Example 2-5 | 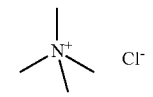 |
| Example 2-6 | 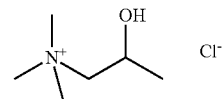 |
| Example 2-7 | 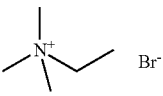 |
| Example 2-8 | 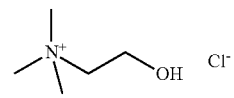 |
| Example 2-9 | 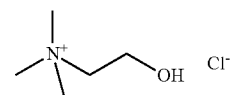 |
| Example 2-10 | 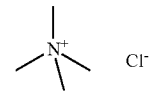 |
| Example 2-11 | 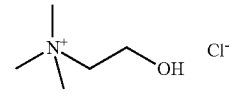 |
| Example 2-12 | 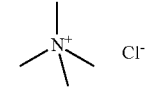 |
| Example 2-13 | 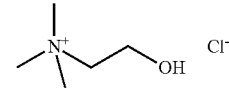 |

TABLE 2-2

|  | Source composition | | | | | Crystallized product | |
| --- | --- | --- | --- | --- | --- | --- | --- |
|  | $SiO_2$/ $Al_2O_3$ ratio | Na/ $SiO_2$ ratio | K/ $SiO_2$ ratio | Q/ $SiO_2$ ratio | Seed crystal (wt. %) | Crystal phase | Yield (wt. %) |
| Example 2-1 | 23 | 0.12 | 0.04 | 0.03 | 10 | AEI | 80 |
| Example 2-2 | 25 | 0.15 | 0.01 | 0.03 | 5 | AEI | 76 |
| Example 2-3 | 25 | 0.12 | 0.04 | 0.03 | 10 | AEI | 76 |
| Example 2-4 | 25 | 0.12 | 0.01 | 0.03 | 5 | AEI | 71 |
| Example 2-5 | 27 | 0.12 | 0.04 | 0.015 | 5 | AEI | 71 |
| Example 2-6 | 27 | 0.12 | 0.04 | 0.05 | 5 | AEI | 73 |
| Example 2-7 | 27 | 0.12 | 0.04 | 0.05 | 5 | AEI | 71 |
| Example 2-8 | 36 | 0.12 | 0.04 | 0.03 | 10 | AEI | 71 |
| Example 2-9 | 20 | 0.15 | 0.01 | 0.03 | 10 | AEI | 79 |
| Example 2-10 | 25 | 0.16 | 0.04 | 0.002 | 5 | AEI | 70 |
| Example 2-11 | 26 | 0.16 | 0.04 | 0.015 | 5 | AEI | 71 |
| Example 2-12 | 26 | 0.16 | 0.04 | 0.002 | 5 | AEI | 70 |
| Example 2-13 | 24 | 0.12 | 0.04 | 0.03 | 10 | AEI | 80 |

From Table 2-2, it was confirmed that, in all the examples, AEI zeolites were produced in high yields, which were 70% or greater, within 48 hours. Furthermore, from Example 10, it was confirmed that the crystallization time of the AEI zeolite was shortened and the effect due to the quaternary ammonium cation contained in the source composition was exhibited even when the content of the quaternary ammonium cation was extremely small, which was the Q/$SiO_2$ ratio of 0.002 or greater.

Comparative Example 2-1

The crystallization was performed by the same method as for Example 2-2 except for using no (2-hydroxyethyl)trimethylammonium chloride and changing the crystallization time to 72 hours. Then, the obtained solid was washed and dried.

As a result of the XRD measurement, this crystallized product was an amorphous aluminosilicate, and the yield of the AEI zeolite was 0%. The major composition and results of the source composition of the present comparative example is shown in Table 2-4.

Comparative Example 2-2

The crystallization was performed by the same method as for Example 2-1 except for using tetraethylammonium hydroxide in place of the (2-hydroxyethyl)trimethylammonium chloride and changing the composition of the source composition to the following composition. Then, the obtained solid was washed and dried.
  $SiO_2$/$Al_2O_3$ ratio: 25
  Na/$SiO_2$ ratio: 0.12
  K/$SiO_2$ ratio: 0.01
  (Na+K)/$SiO_2$ ratio: 0.13
  K/Na ratio: 0.08
  DMDMPOH/$SiO_2$ ratio: 0.2
  TEA/$SiO_2$ ratio: 0.03
  $H_2O$/$SiO_2$ ratio: 10
  $OH^-$/$SiO_2$ ratio: 0.36

The content of the AEI zeolite of the source composition was 4.8 wt. %, and this was 5 wt. % in terms of the weight proportion of the Al and the Si of the AEI zeolite relative to the total weight of the Al and the Si of the amorphous aluminosilicate.

As a result of the XRD measurement, this crystallized product was an amorphous aluminosilicate, and the yield of the AEI zeolite was 0%. The structural formula of the additive used in the present comparative example is shown in Table 2-3. Furthermore, the major composition and results of the source composition of the present example is shown in Table 2-4.

Comparative Example 2-3

The crystallization was performed by the same method as for Comparative Example 2-2 except for using tetrapropylammonium hydroxide in place of the (2-hydroxyethyl)trimethylammonium chloride. Then, the obtained solid was washed and dried.

As a result of the XRD measurement, this crystallized product was an amorphous aluminosilicate, and the yield of the AEI zeolite was 0%. The structural formula of the additive used in the present comparative example is shown in Table 2-3. Furthermore, the major composition and results of the source composition of the present example is shown in Table 2-4.

Comparative Example 2-4

The crystallization was performed by the same method as for Comparative Example 2-2 except for using diethyldimethylammonium hydroxide in place of the (2-hydroxyethyl)trimethylammonium chloride. Then, the obtained solid was washed and dried.

As a result of the XRD measurement, this crystallized product was an amorphous aluminosilicate, and the yield of the AEI zeolite was 0%. The structural formula of the additive used in the present comparative example is shown in Table 2-3. Furthermore, the major composition and results of the source composition of the present example is shown in Table 2-4.

Comparative Example 2-5

The crystallization was performed by the same method as for Example 2-6 except for using ethyl(2-hydroxyethyl)dimethylammonium chloride in place of the (2-hydroxyethyl)trimethylammonium chloride. Then, the obtained solid was washed and dried.

As a result of the XRD measurement, this crystallized product was an amorphous aluminosilicate, and the yield of the AEI zeolite was 0%. The structural formula of the additive used in the present comparative example is shown in Table 2-3. Furthermore, the major composition and results of the source composition of the present example is shown in Table 2-4.

Comparative Example 2-6

The crystallization was performed by the same method as for Example 2-6 except for using di(2-hydroxyethyl)dimethylammonium chloride in place of the (2-hydroxyethyl)trimethylammonium chloride. Then, the obtained solid was washed and dried.

As a result of the XRD measurement, this crystallized product was an amorphous aluminosilicate, and the yield of the AEI zeolite was 0%. The structural formula of the additive used in the present comparative example is shown in Table 2-3. Furthermore, the major composition and results of the source composition of the present example is shown in Table 2-4.

Comparative Example 2-7

The crystallization was performed by the same method as for Example 2-6 except for using diethyldi(2-hydroxyethyl)ammonium chloride in place of the (2-hydroxyethyl)trimethylammonium chloride. Then, the obtained solid was washed and dried.

As a result of the XRD measurement, this crystallized product was an amorphous aluminosilicate, and the yield of the AEI zeolite was 0%. The structural formula of the additive used in the present comparative example is shown in Table 2-3. Furthermore, the major composition and results of the source composition of the present example is shown in Table 2-4.

TABLE 2-3

| | Additive |
|---|---|
| Comparative Example 2-1 | None |
| Comparative Example 2-2 | [structure: triethylmethylammonium hydroxide] OH⁻ |
| Comparative Example 2-3 | [structure: tetrapropylammonium hydroxide] OH⁻ |
| Comparative Example 2-4 | [structure: tetramethylammonium hydroxide variant] OH⁻ |
| Comparative Example 2-5 | [structure: choline chloride-like] Cl⁻ |
| Comparative Example 2-6 | [structure: bis(hydroxyethyl)ammonium] Cl⁻ |
| Comparative Example 2-7 | [structure: ethyl bis(hydroxyethyl) ammonium] Cl⁻ |

Comparative Example 2-1 was a production method same as the method of Example 2-2 except for containing no quaternary ammonium salt. However, the AEI zeolite was not produced even after 72 hours, and it was found that Comparative Example 2-1 requires the crystallization time of at least 72 hours. Furthermore, from Comparative Examples 2-2 to 2-7, it was found that the AEI zeolite was not produced in a short period of time, which was 48 hours, even with the source composition containing a substance except the quaternary ammonium salt of the present invention.

Comparative Example 3-1

A source composition formed from the composition shown below was obtained by mixing a zeolite Y ($SiO_2$/$Al_2O_3$ ratio: 23.8), a DMDMPOH aqueous solution, sodium hydroxide, potassium hydroxide, an AEI zeolite ($SiO_2$/$Al_2O_3$ ratio: 16), and pure water.

$SiO_2$/$Al_2O_3$=23
Na/$SiO_2$=0.05
K/$SiO_2$=0.05
$H_2O$/$SiO_2$=10
DMDMPOH/$SiO_2$=0.20
$OH^-$/$SiO_2$=0.30

The content of the AEI zeolite of the source composition was 4.8 wt. %, and this was 5 wt. % in terms of the weight proportion of the Al and the Si of the AEI zeolite relative to the total weight of the Al and the Si of the amorphous aluminosilicate.

The $(Si-Al)_{Cry}/(Si-Al)_{Total}$ of the source composition was 100 wt. %.

The obtained source composition was sealed in a stainless steel autoclave. The source composition was heated at 170° C. for 48 hours while the autoclave was rotated, to crystallize the source composition.

The obtained product was filtered, washed, and then dried overnight at 110° C. in the atmosphere. The obtained product was an AEI zeolite and was an SSZ-39 having the $SiO_2$/$Al_2O_3$ ratio of 18.

Measurement Example

Each of the AEI zeolites obtained in Examples 2-11 to 2-13 and Comparative Example 3-1 was calcined in the air

TABLE 2-4

| | Source composition | | | | Seed crystal (wt. %) | Crystallization time (hour) | Crystallized product | |
|---|---|---|---|---|---|---|---|---|
| | $SiO_2$/$Al_2O_3$ ratio | Na/$SiO_2$ ratio | K/$SiO_2$ ratio | Q/$SiO_2$ ratio | | | Crystal phase | Yield (wt. %) |
| Comparative Example 2-1 | 25 | 0.15 | 0.01 | 0 | 5 | 72 | Amorphous | 0 |
| Comparative Example 2-2 | 25 | 0.12 | 0.01 | 0.03 | 5 | 72 | Amorphous | 0 |
| Comparative Example 2-3 | 25 | 0.12 | 0.01 | 0.03 | 5 | 72 | Amorphous | 0 |
| Comparative Example 2-4 | 25 | 0.12 | 0.01 | 0.03 | 5 | 72 | Amorphous | 0 |
| Comparative Example 2-5 | 27 | 0.12 | 0.04 | 0.05 | 5 | 48 | Amorphous | 0 |
| Comparative Example 2-6 | 27 | 0.12 | 0.04 | 0.05 | 5 | 48 | Amorphous | 0 |
| Comparative Example 2-7 | 27 | 0.12 | 0.04 | 0.05 | 5 | 48 | Amorphous | 0 | at 600° C. for 2 hours to transform the AEI zeolite into a proton type. The AEI zeolite after the conversion was subjected to hydrothermal durability treatment in the following conditions.

Treatment temperature: 900° C.
Treatment time: 4 hours
Treatment atmosphere: in air circulation containing moisture (water: 10 vol. %; air: 90 vol. %)
Rate of temperature increase: 20° C./min
Atmosphere during temperature increase: in the air circulation when the temperature is from the room temperature to 200° C., and in the air circulation containing moisture when the temperature exceeds 200° C.

The relative value of the maintenance ratio of crystallinity of each of the AEI zeolites relative to the maintenance ratio of crystallinity of Comparative Example 3-1 is shown in Table 3-1.

TABLE 3-1

| | Maintenance ratio of crystallinity (relative value) (%) |
|---|---|
| Example 2-11 | 137 |
| Example 2-12 | 186 |
| Example 2-13 | 204 |
| Comparative Example 3-1 | 100 |

From Table 3-1, it was confirmed that the maintenance ratio of crystallinity of the AEI zeolite obtained by the production method according to an embodiment of the present invention after the hydrothermal durability treatment was higher than the maintenance ratio of crystallinity of the AEI zeolite obtained by inducing transformation of zeolite Y, and achieved high crystal stability.

INDUSTRIAL APPLICABILITY

The production method according to an embodiment of the present invention can be used as an industrial method for producing an AEI zeolite, especially as an industrial method for producing an AEI zeolite having the $SiO_2/Al_2O_3$ ratio of 100 or less, or 50 or less. Furthermore, the production method can be used as an industrial method for producing an AEI zeolite that is suitable as a support for catalyst or the like and that has the $SiO_2/Al_2O_3$ ratio of 100 or less.

All of the content of the specifications, scopes of patent claims, and abstracts of JP 2015-159852 filed on Aug. 13, 2015 and JP 2015-161754 filed on Aug. 19, 2015 is cited here and incorporated as a disclosure of the specification of the present invention.

The invention claimed is:

1. A method for producing an AEI zeolite, the method comprising crystallizing a composition containing an alumina source, a silica source, a structure directing agent, a sodium source, and water,
   a weight proportion of crystalline aluminosilicate relative to a total weight of the alumina source and the silica source being from 0 wt. % to 10 wt. %, and wherein the composition contains a cation represented by $(CH_3)_3RN^+$, where R represents an alkyl group having from 1 to 4 carbons, and the alkyl group may contain at least one substituent.

2. The method according to claim 1, wherein the alumina source is an amorphous alumina compound.

3. The method according to claim 1, wherein the alumina source is at least one type selected from the group consisting of aluminum sulfate, aluminum chloride, aluminum hydroxide, pseudoboehmite, alumina sol, and amorphous aluminosilicate.

4. The method according to claim 1, wherein the structure directing agent is a piperidinium cation.

5. The method according to claim 1, wherein the structure directing agent is at least one type selected from the group consisting of 1,1,3,5-tetramethylpiperidinium cation, 1,1-diethyl-2,6-dimethylpiperidinium cation, 1,1,2,6-tetramethylpiperidinium cation, 1-ethyl-1,2,6-trimethylpiperidinium cation, and 1,1,2-triethylpiperidinium cation.

6. The method according to claim 1, wherein the composition does not contain crystalline aluminosilicate having a Y-structure.

7. The method according to claim 1, wherein a fluorine content in the composition is 100 ppm by weight or less.

8. The method according to claim 1, wherein a molar ratio of silica to alumina of the AEI zeolite is 100 or less.

9. The method according to claim 1, wherein the cation is at least one type selected from the group consisting of tetramethylammonium, ethyltrimethylammonium, (2-hydroxyethyl)trimethylammonium, and (2-hydroxypropyl) trimethyl ammonium.

10. The method according to claim 1, wherein a molar ratio of hydroxide ion to silica in the composition is less than 0.45.

11. The method according to claim 1, wherein a molar ratio of hydroxide ion to silica in the composition is 0.45 or greater.

* * * * *